US012592891B2

(12) United States Patent
Feneyrou et al.

(10) Patent No.: US 12,592,891 B2
(45) Date of Patent: Mar. 31, 2026

(54) CONGESTION CONTROL APPLYING ADAPTIVE PATH SELECTION

(71) Applicant: Vay Technology GmbH, Berlin (DE)

(72) Inventors: Damien Feneyrou, Berlin (DE); Ralf Globisch, Berlin (DE)

(73) Assignee: Vay Technology GmbH, Berlin (DE)

( * ) Notice: Subject to any disclaimer, the term of this patent is extended or adjusted under 35 U.S.C. 154(b) by 0 days.

(21) Appl. No.: 18/417,943

(22) Filed: Jan. 19, 2024

(65) Prior Publication Data

US 2025/0240245 A1 Jul. 24, 2025

(51) Int. Cl.
*H04L 47/215* (2022.01)
*H04L 47/11* (2022.01)
*H04L 47/125* (2022.01)

(52) U.S. Cl.
CPC ............ *H04L 47/215* (2013.01); *H04L 47/11* (2013.01); *H04L 47/125* (2013.01)

(58) Field of Classification Search
CPC ..... H04L 47/215; H04L 47/41; H04L 45/245; H04L 47/125; H04L 45/24; H04L 47/32; H04L 47/781; H04L 47/822; H04L 47/11; H04L 47/10; H04L 45/243
See application file for complete search history.

(56) References Cited

U.S. PATENT DOCUMENTS

| | | | |
|---|---|---|---|
| 2008/0316921 A1* | 12/2008 | Mathews | ................ H04L 47/10 370/230 |
| 2020/0136977 A1 | 4/2020 | Chen et al. | |
| 2022/0086094 A1* | 3/2022 | Amend | ................... H04L 45/22 |
| 2022/0109622 A1 | 4/2022 | Yeh et al. | |

FOREIGN PATENT DOCUMENTS

| | | |
|---|---|---|
| CN | 113595919 A | 11/2021 |
| EP | 3535891 B1 | 8/2020 |

OTHER PUBLICATIONS

T. Li, L. Wu, F. Liu, Y. Wang, C. Yang and Wu Zhang, "Stability and control of network congestion control system," 2009 Chinese Control and Decision Conference, Guilin, China, 2009, pp. 381-384, doi: 10.1109/CCDC.2009.5195085. (Year: 2009).*
S. Fang, C. H. Foh and K. M. M. Aung, "Prompt congestion reaction scheme for data center network using multiple congestion points," 2012 IEEE International Conference on Communications (ICC), Ottawa, ON, Canada, 2012, pp. 2679-2683, doi: 10.1109/ICC.2012. 6364295. (Year: 2012).*
International Search Report & Written Opinion for International Application No. PCT/EP2025/051075, dated Mar. 31, 2025.

* cited by examiner

*Primary Examiner* — Messeret F Gebre
(74) *Attorney, Agent, or Firm* — Athorus, PLLC

(57) ABSTRACT

Described are systems and methods for determining one or more data paths of a network link for transmitting data packets of a data stream for load balancing the data across the paths while avoiding saturation of the network link and/or alleviating congestion of the network link. The selection of the one or more paths may be performed by adaptively modifying a redundancy of the data packets being transmitted on the transmission paths of the network link in view of current network parameters associated with the paths of the network link, so that the data stream is effectively load balanced across the paths of the network link while ensuring redundancy of the data stream and maintaining the data rate of the data stream.

19 Claims, 11 Drawing Sheets

300

400

| N | Refilled Token Bucket Values | | | | | Token Bucket Values After Transmission | | | | | Sent qty |
|---|---|---|---|---|---|---|---|---|---|---|---|
| | Path 0 | Path 1 | Path 2 | Path 3 | Global | Path 0 | Path 1 | Path 2 | Path 3 | Global | |
| 0 | 0.5+0.5 = 1.0 | 0.5+0.6 = 1.1 | 0.5+1.0 = 1.5 | 0.5+0.3 = 0.8 | 0.5+2.4 = 2.9 | 1.0 | 1.1-1.0 = 0.1 | 1.5-1.0 = 0.5 | 0.8 | 2.9-2.0 = 0.9 | [2.9] = 2 |
| 1 | 1.5 | 0.7 | 1.5 | 1.1 | 3.3 | 0.5 | 0.7 | 0.5 | 0.1 | 0.3 | 3 |
| 2 | 1.0 | 1.3 | 1.5 | 0.4 | 2.7 | 1.0 | 0.3 | 0.5 | 0.4 | 0.7 | 2 |
| 3 | 1.5 | 0.9 | 1.5 | 0.7 | 3.1 | 0.5 | -0.1 | 0.5 | 0.7 | 0.1 | 3 |
| 4 | 1.0 | 0.5 | 1.5 | 1.0 | 2.5 | 0.0 | 0.5 | 0.5 | 1.0 | 0.5 | 2 |
| 5 | 0.5 | 1.1 | 1.5 | 1.3 | 2.9 | 0.5 | 1.1 | 0.5 | 0.3 | 0.9 | 2 |
| 6 | 1.0 | 1.7 | 1.5 | 0.6 | 3.3 | 0.0 | 0.7 | 0.5 | 0.6 | 0.3 | 3 |
| 7 | 0.5 | 1.3 | 1.5 | 0.9 | 2.7 | 0.5 | 0.3 | 0.5 | 0.9 | 0.7 | 2 |
| 8 | 1.0 | 0.9 | 1.5 | 0.8 | 3.1 | 0.0 | -0.1 | 0.5 | 0.8 | 0.1 | 3 |
| 9 | 0.5 | 0.5 | 1.5 | 1.1 | 2.5 | 0.5 | 0.5 | 0.5 | 0.1 | 0.5 | 2 |

| N | Refilled Token Bucket Values | | | | | Token Bucket Values After Transmission | | | | | Sent qty |
|---|---|---|---|---|---|---|---|---|---|---|---|
| | Path 0 | Path 1 | Path 2 | Path 3 | Global | Path 0 | Path 1 | Path 2 | Path 3 | Global | |
| 0 | 0.5+0.1= 0.6 | 0.5+0.2= 0.7 | 0.5+0.4= 0.9 | 0.5+0.1= 0.6 | 0.5+0.8 = 1.3 | 0.6 | 0.7 | 0.9-1.0 = -0.1 | 0.6 | 1.3-1.0 = 0.3 | [1.3] = 1 |
| 1 | 0.7 | 0.9 | 0.3 | 0.7 | 1.1 | 0.7 | -0.1 | 0.3 | 0.7 | 0.1 | 1 |
| 2 | 0.8 | 0.1 | 0.7 | 0.8 | 0.9 -> 1.0 | -0.2 | 0.1 | 0.7 | 0.8 | 0.0 | 1 |
| 3 | -0.1 | 0.3 | 1.1 | 0.9 | 0.8 -> 1.0 | -0.1 | 0.3 | 0.1 | 0.9 | 0.0 | 1 |
| | • • • | • • • | • • • | • • • | • • • | • • • | • • • | • • • | • • • | • • • | • • • |

CONGESTION CONTROL APPLYING ADAPTIVE PATH SELECTION

BACKGROUND

Recently, there has been a push towards the automated operation of vehicles. For example, technological advances have facilitated a transition from vehicles being manually operated and driven by drivers located in a vehicle to other methods of operating a vehicle, such as semi-autonomous driving, fully autonomous driving, teleoperated vehicles, and the like. In teleoperated vehicles (e.g., teledriving), a teleoperator (or teledriver) may use a teleoperator station to remotely drive a vehicle while data is transmitted between the vehicle and the teleoperator station via a wireless communication network. To facilitate such remote driving applications, multiple live video streams representing views of the vehicle's environment may be captured, transmitted, and presented to the teleoperator at the teleoperator station. Accordingly, timely transmission and delivery of the live video streams can be crucial to ensure safe operation of the vehicle being operated by a teleoperator. This is typically performed by implementing congestion control algorithms to modify the data rate of the data streams to avoid saturating a network link. However, traditional congestion control techniques typically adjust the data rate of the data streams, which may result in a degradation of the data and/or may not ensure any redundancy of the data.

BRIEF DESCRIPTION OF DRAWINGS

The detailed description is described with reference to the accompanying figures.

FIGS. 4A and 4B are exemplary tables illustrating exemplary path token bucket values and global token bucket values, in accordance with exemplary embodiments of the present disclosure.

DETAILED DESCRIPTION

Figure 1A:
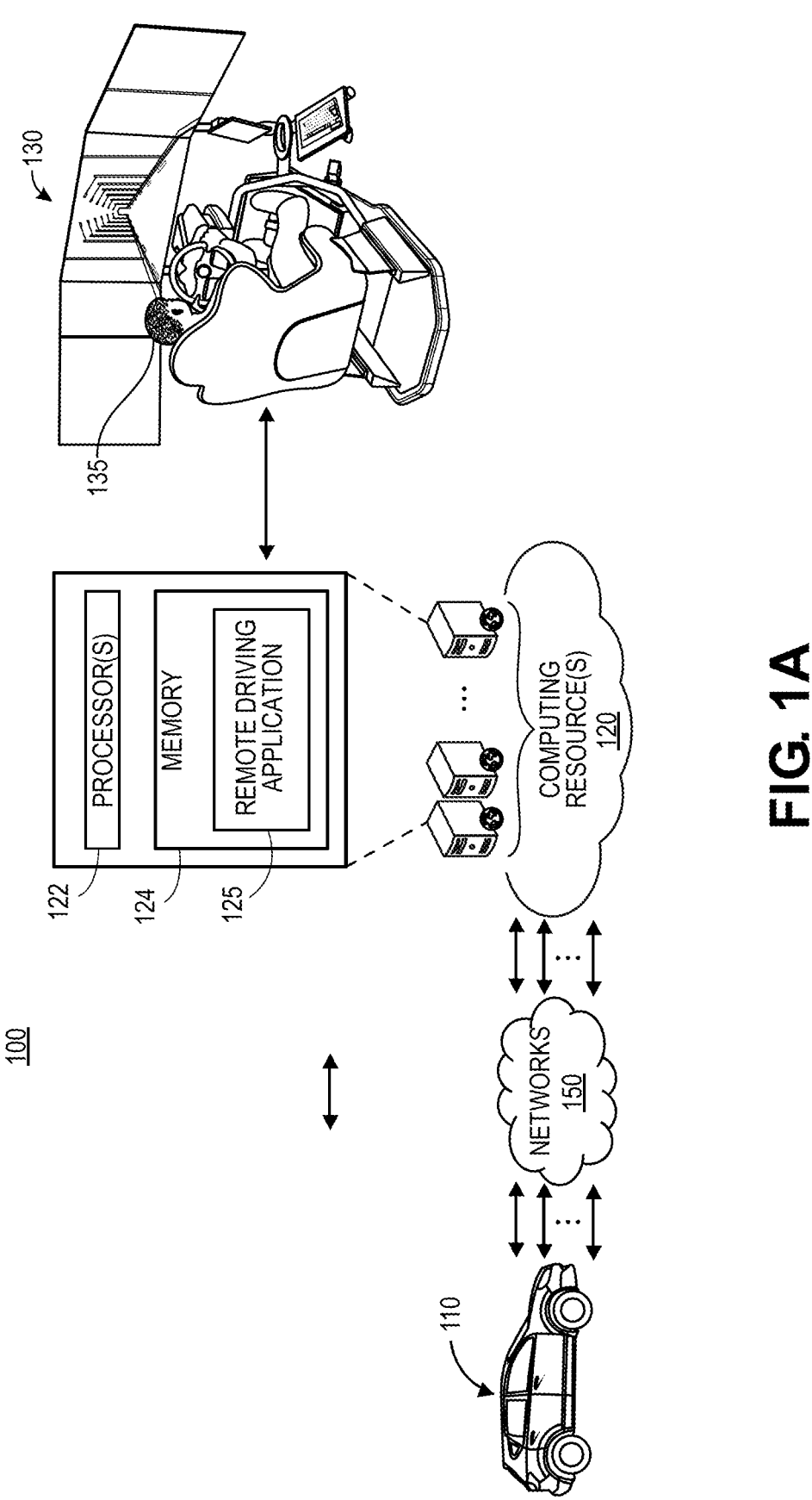
FIGS. 1A and 1B are illustrations of an exemplary remote driving system, according to exemplary embodiments of the present disclosure.

As is set forth in greater detail herein, embodiments of the present disclosure are generally directed to systems and methods for determining one or more data paths of a network link for transmitting data packets of a data stream (e.g., video stream, etc.) for load balancing the data across the paths while avoiding saturation of the network link and/or alleviating congestion of the network link. According to exemplary embodiments of the present disclosure, the selection of the one or more paths may be performed by adaptively modifying a redundancy of the data packets being transmitted on the transmission paths of the network link in view of current network parameters associated with the paths of the network link, so that the data stream is effectively load balanced across the paths of the network link while ensuring redundancy of the data stream and maintaining the data rate of the data stream.

In exemplary implementations of the present disclosure, a token bucket technique may be employed in adaptively selecting paths of a network link to determine which paths of the network link may be used to transmit data packets of the data stream. For example, a path token bucket may be initialized for each available path and a global token bucket may be initialized for a global redundancy value across all available paths. Further, network parameters, such as a data rate for the data stream, a congestion value (e.g., congestion window, etc.), a data in flight value, a feedback period, and the like, may be used to determine a refill rate for the token bucket for each path, as well as a global refill rate for the global token bucket across all available paths. In exemplary implementations, the path token bucket refill rates determined using the network parameters may represent a redundancy capacity for each path. Further, the refill rates for all the paths may be summed to determine the global refill rate for the global token bucket, which may represent a redundancy value across all paths. The path token buckets for each path, as well as the global token bucket, may be refilled according to their respective refill rates, and one or more of the paths may be selected for transmitting packets based on the refilled token bucket values and the refilled global token bucket value.

After transmission of packets on the selected paths, the path token bucket values for the paths that were selected for the transmission of the packets and the global token bucket value may be updated in view of the transmission of the packets. The path token buckets for each path, as well as the global token bucket value, may again be refilled according to their respective refill rates in preparation of the selection of one or more paths for the next round of transmission of packets. Accordingly, the refilling of the path token bucket values and the global token bucket, selection of one or more paths for transmission of the packets of the data stream, and updating of the path token bucket values for the token buckets of the selected paths and the global token bucket may be continuously performed in connection with the transmission of packets, so as to avoid saturation and/or alleviate congestion of the network link while also maintaining the data rate of the data stream and redundancy of the packets being transmitted. Further, the refill rates may be periodically updated, as network conditions change, which may result in a change in the corresponding refill rates of the path token buckets and/or the global token bucket.

Certain embodiments of the present disclosure may also employ redundancy capping techniques, so as to limit network costs, facilitate scaling, and the like, in connection with the selection of one or more paths of the network link. Accordingly, in such implementations, the global redundancy value of the global token bucket may be limited to a predetermined threshold and/or the path token bucket values for the paths may not be refilled if the token bucket value of a particular path is above a credit limit. Limiting the global token bucket value and/or refilling of path token buckets can ensure a minimum redundancy and effective load balancing of the data stream across the paths of the data link.

According to exemplary embodiments of the present disclosure, data rate adaptation techniques may also be employed in connection with the selection of one or more paths of the network link in view of network conditions. For example, in situations where network conditions do not permit a desired and/or target redundancy in connection with the data stream, the data rate of the data stream may be adjusted (e.g., lowered, etc.) to compensate for the degraded network conditions. Additionally, exemplary implementations of the present disclosure also provide for adjusting the data rate (e.g., increasing, etc.) as network conditions improve. Further, the data rate may have maximum and minimum thresholds, so as to prevent the data rate from being below or above threshold values, and the adjustments to the data rate may be smoothed and/or filtered, so as to avoid large swings in the data rate.

Although embodiments of the present disclosure are primarily described in connection with the selection of paths of a network link in the context of a remote driving system (e.g., a vehicle teleoperating system, teledriving system, etc.), embodiments of the present disclosure are also applicable to other platforms, systems, and/or environments that may benefit from selecting one or more paths of a network link for transmitting packets of a data stream for load balancing the data across the paths of the network link, so as to maintain redundancy of the data stream while avoiding saturation of the network link and/or alleviating congestion of the network link.

Figure 1B:
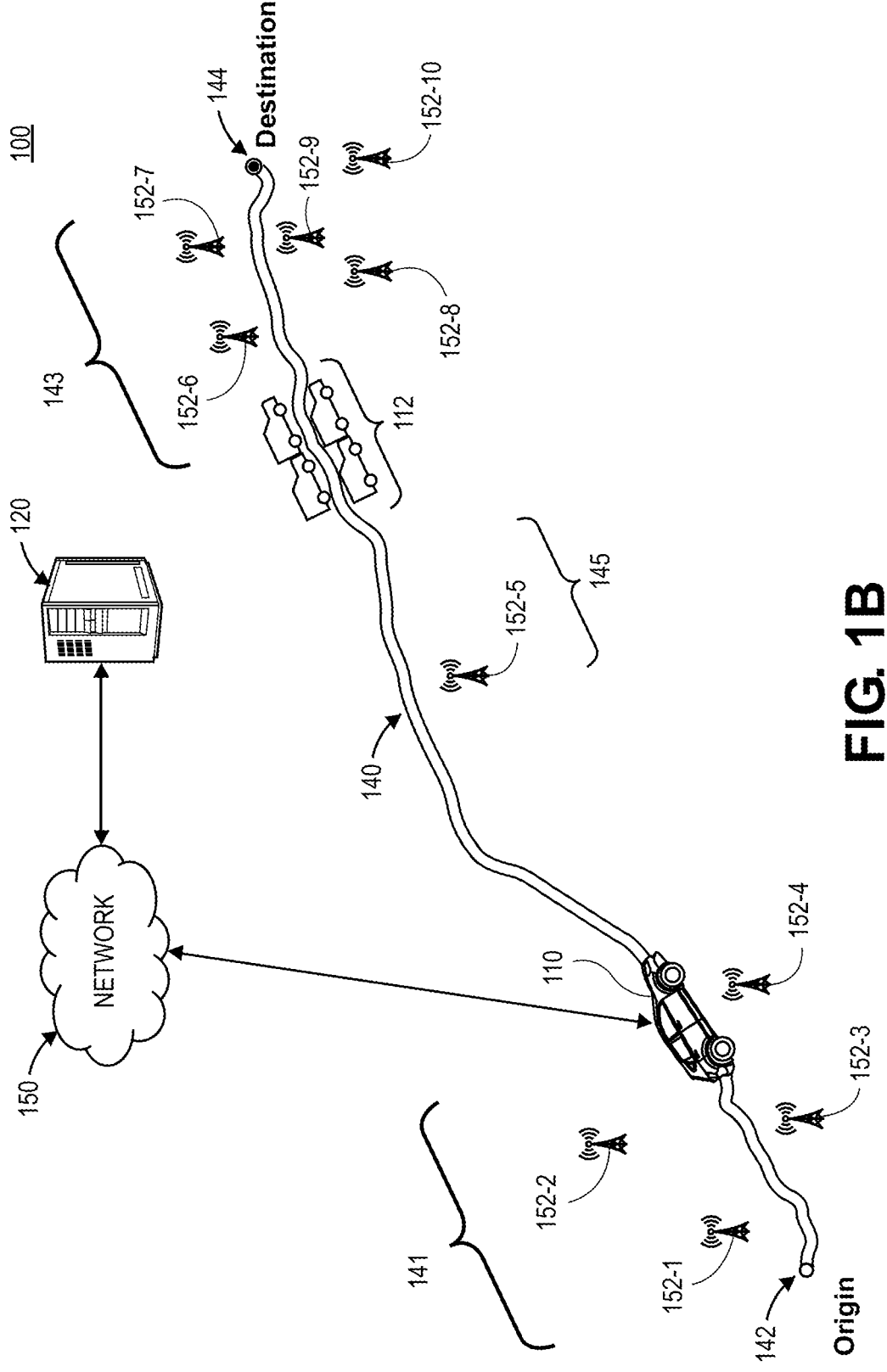

FIGS. 1A and 1B are illustrations of an exemplary remote driving system 100, according to exemplary embodiments of the present disclosure.

As shown in FIGS. 1A and 1B, exemplary remote driving system 100 may include vehicle 110, which may communicate, via networks 150, with one or more computing resources 120. Computing resources 120 may form part of, or be in communication with, remote driving terminal 130, that may be operated by user 135. In the illustrated implementation, vehicle 110 may include a car, sports utility vehicle, van, truck, or any other type of vehicle that may be configured and/or adapted to be remotely driven, controlled, and/or otherwise operated by user 135 operating remote driving terminal 130. According to exemplary embodiments of the present disclosure, computing resource 120 may be implemented as one or more servers or other computing resources, and, in some instances, form a portion of a network-accessible computing platform implemented as a computing infrastructure of processors, storage, software, data access, and so forth that is maintained and accessible by components/devices of the remote driving application 125 via networks 150, such as the Internet. For example, computing resources 120 may not require end-user knowledge of the physical location and configuration of the system that delivers the services and may include "on-demand computing platforms," "software as a service (SaaS)," "infrastructure as a service (IaaS)," "platform as a service (PaaS)," "platform computing," "network-accessible platforms," "data centers," "virtual computing platforms," "cloud services," "data centers," and so forth. As illustrated, each remote computing resource 120 may include one or more processors 122 and memory 124, which may be configured to execute remote driving application 125, which may receive, process, send, etc. various information (e.g., images, sensor information, state information, inputs, commands, etc.), commands, and the like between vehicle 110 and remote driving terminal 130 to facilitate remote operation of vehicle 110. Vehicle 110 may also include processors and a memory configured to execute an application to facilitate remote operation of vehicle 110.

According to exemplary embodiments of the present disclosure, vehicle 110 may include one or more imaging devices, cameras, sensors, and the like configured to capture environmental information (e.g., images, video streams, etc.) of the environment in which vehicle 110 is operating, state information (e.g., speed, direction, location, route, acceleration, steering angles, etc.) regarding operation of vehicle 110, and/or other information in connection with the remote operation of vehicle 110 via remote driving terminal 130. Accordingly, the information captured by the imaging devices, cameras, and/or sensors of vehicle 110 may be sent to remote driving terminal 130 to be presented on remote driving terminal 130 to user 135 to facilitate remote operation of vehicle 110. For example, the various information may be used to generate visualization of vehicle 110 in the environment in which it is operating (e.g., video imagery, augmented reality, virtual reality, and the like). Based on the visualization of vehicle 110, user 135 may remotely operate vehicle 110 via inputs and/or commands made to remote driving terminal 135. For example, remote driving terminal 130 may include a steering wheel, joystick, keyboard, pedal, or other input devices through which user 135 may provide operational inputs and/or commands (e.g., steering inputs/commands, acceleration inputs/commands, braking inputs/commands, etc.) in connection with remote operation of vehicle 110. Accordingly, the inputs and/or commands provided by user 135 may be sent to vehicle 110 to facilitate remote operation of vehicle 110.

As shown in FIGS. 1A and 1B, networks 150 may include one or more wireless networks configured to provide bi-directional communication between vehicle 110 and computing resources 120 (and remote driving terminal 130). For example, networks 150 may include wired technologies (e.g., wires, USB, fiber optic cable, etc.), wireless technologies (e.g., RF, IR, NFC, cellular, satellite, Bluetooth, 4G wireless communication, 5G wireless communication, LTE wireless communication, WiFi, etc.), or other connection technologies. Networks 150 are representative of any type of communication network, including data and/or voice network, and may be implemented using wired infrastructure (e.g., cable, CAT6, fiber optic cable, etc.), a wireless infrastructure (e.g., RF, cellular, microwave, satellite, Bluetooth, etc.), and/or other connection technologies. Accordingly, exemplary embodiments of the present disclosure can facilitate selection of one or more paths of networks 150 in transmitting data between vehicle 110 and computing resources 120.

In the exemplary implementation illustrated in FIGS. 1A and 1B, safe remote operation of vehicle 110 relies on the timely transmission and delivery of information and data between vehicle 110 and computing resources 120 (and remote driving terminal 130). However, as shown in FIG. 1B, as vehicle 110 travels along route 140 from origin 142 to destination 144, vehicle 110 may experience different network conditions. For example, vehicle 110 may travel through areas 141 and 143 where networks 150 includes strong network coverage and/or low network usage (e.g., illustrated by a relatively high concentration of antennas 152-1, 152-2, 152-3, 152-4 in area 141 and antennas 152-6, 152-7, 152-8, 152-9, 152-10 in area 143), area 145 where networks 150 may include poor network coverage (e.g., illustrated by a relatively low concentration of antenna 152-5), areas where networks 150 may experience heavy usage (e.g., illustrated by vehicles 112), and the like.

Accordingly, exemplary embodiments of the present disclosure can facilitate determining one or more paths of networks 150 for transmitting data between vehicle 110 and computing resources 120 (and remote driving terminal 130) to load balance the data across the paths and avoid saturation and/or alleviate congestion of networks 150.

According to exemplary embodiments of the present disclosure, vehicle 110 and/or computing resources 120 may determine one or more paths of networks 150 on which to transmit data packets between vehicle 110 and computing resources 120 in connection with remote operation of vehicle 110. For example, the data packets transmitted from vehicle 110 to computing resources 120 (and remote driving terminal 130) may comprise data streams corresponding to images, video, and/or other information captured by imaging devices, cameras, sensors, etc. associated with vehicle 110 that are transmitted to computing resources 120 (and remote driving terminal 130) to facilitate remote operation of vehicle 110. In exemplary embodiments, the paths may be selected by adaptively modifying a redundancy of the data packets being transmitted on the transmission paths of networks 150 in view of current network parameters being experienced by networks 150, so that the data stream is load balanced across the paths of the network link to ensure redundancy of the data stream while maintaining the data rate of the data stream.

In exemplary implementations of the present disclosure, a token bucket technique may be employed in adaptively selecting from the available paths of networks 150 to determine which paths may be used to transmit data packets of the data stream. For example, a path token bucket may be initialized for each available path and a global token bucket may be initialized for a global redundancy value across all available paths. Further, network parameters, such as a data rate for the data stream, a congestion value (e.g., congestion window, etc.), a data in flight value, a feedback period, and the like, may be used to determine a refill rate for the path token bucket for each path, as well as a global refill rate for the global token bucket. In exemplary implementations, the token bucket refill rates determined using these network parameters may represent a redundancy capacity for each path, and the global refill rate may represent a global redundancy capacity across all available paths. In exemplary implementations, the refill rates for all the paths may be summed to determine the global redundancy refill rate for the global token bucket across all paths. The redundancy capacity for each path and the global redundancy capacity may be applied as refill rates for the token buckets associated with each path and a global redundancy refill rate, respectively. According to exemplary embodiments of the present disclosure, the refill rate for each path may be represented as:

$$\text{refill rate} = \frac{\text{Congestion} - \text{Data}_{Flight}}{\text{Data Rate} * \text{Feedback Period}}$$

where Congestion may represent a congestion value, such as a congestion window, DataFlight may represent data in flight (e.g., expressed as bits, bytes, etc.), Data Rate may represent the data rate of the incoming data stream (e.g., expressed as a bitrate, a byte-rate, etc.), and Feedback Period may represent a time between feedback received by vehicle 110. The path token buckets for each path, as well as the global token bucket, may be refilled according to their respective refill rates, and one or more of the paths may be selected for transmitting packets based on the path token bucket values and the global token bucket value. Accordingly, after selection of the one or more paths, a data packet may be transmitted on each of the selected paths.

After transmission of the data packets on the selected paths, the path token bucket values for the token buckets of the selected paths and the global token bucket value may be updated in view of the transmission of the packets. After the path token bucket values for the token buckets of the selected paths and the global token bucket value have been updated, the path token buckets for each path, as well as the global token bucket, may again be refilled according to their respective refill rates in preparation of the selection of one or more paths for the next transmission of packets. Accordingly, the refilling of the path token bucket and the global token bucket, selection of one or more paths for transmission of the packets of the data stream, and updating of the token bucket values for the token buckets of the selected paths and the global token bucket may be continuously performed in connection with the transmission of packets, so as to avoid saturation and/or alleviate congestion of networks 150 while also maintaining the data rate of the data stream and redundancy of the packets being transmitted. Further, the refill rates may be periodically updated, as network conditions may change, which may result in a change in the corresponding refill rates of the token buckets and/or the global redundancy value.

According to certain aspects of the present disclosure, redundancy capping techniques may also be applied, so as to limit network costs, facilitate scaling, and the like, in connection with the selection of one or more paths of networks 150. As illustrated in FIG. 1B, such a scenario may be experienced by vehicle 110 in areas 141 and/or 143, where there may be strong network coverage (e.g., illustrated by a relatively high concentration of antennas 152-1, 152-2, 152-3, 152-4 in area 141 and antennas 152-6, 152-7, 152-8, 152-9, 152-10 in area 143). Accordingly, in such implementations, the global redundancy value may be capped at a predetermined threshold. Additionally, the path token bucket values May not be refilled if the path token bucket values for any of the paths is above a predetermined credit limit. Limiting the redundancy and/or refilling of token buckets above a credit limit can ensure a minimum redundancy and effective load balancing of the data stream across the paths of the data link.

Further, in scenarios where there is a degradation and/or congestion of networks 150, data rate adaptation techniques may also be employed in connection with the selection of one or more paths of the network link in view of network conditions. As illustrated in FIG. 1B, such a scenario may be experienced by vehicle 110 in area 145 where networks 150 may include poor network coverage (e.g., illustrated by a relatively low concentration of antenna 152-5) and/or areas where network coverage may experience heavy use (e.g., illustrated by vehicles 112). For example, in situations where network conditions do not permit a desired redundancy in connection with the data stream, the data rate of the data stream may be adjusted (e.g., lowered, etc.) to compensate for the degraded network conditions. Additionally, exemplary implementations of the present disclosure also provide for adjusting the data rate (e.g., increasing, etc.) as network conditions improve. Further, the data rate may have maximum and minimum thresholds, so as to prevent the data rate from being below or above threshold values, and the adjustments to the data rate may be smoothed and/or filtered, so as to avoid large swings in the data rate.

Figure 2A:
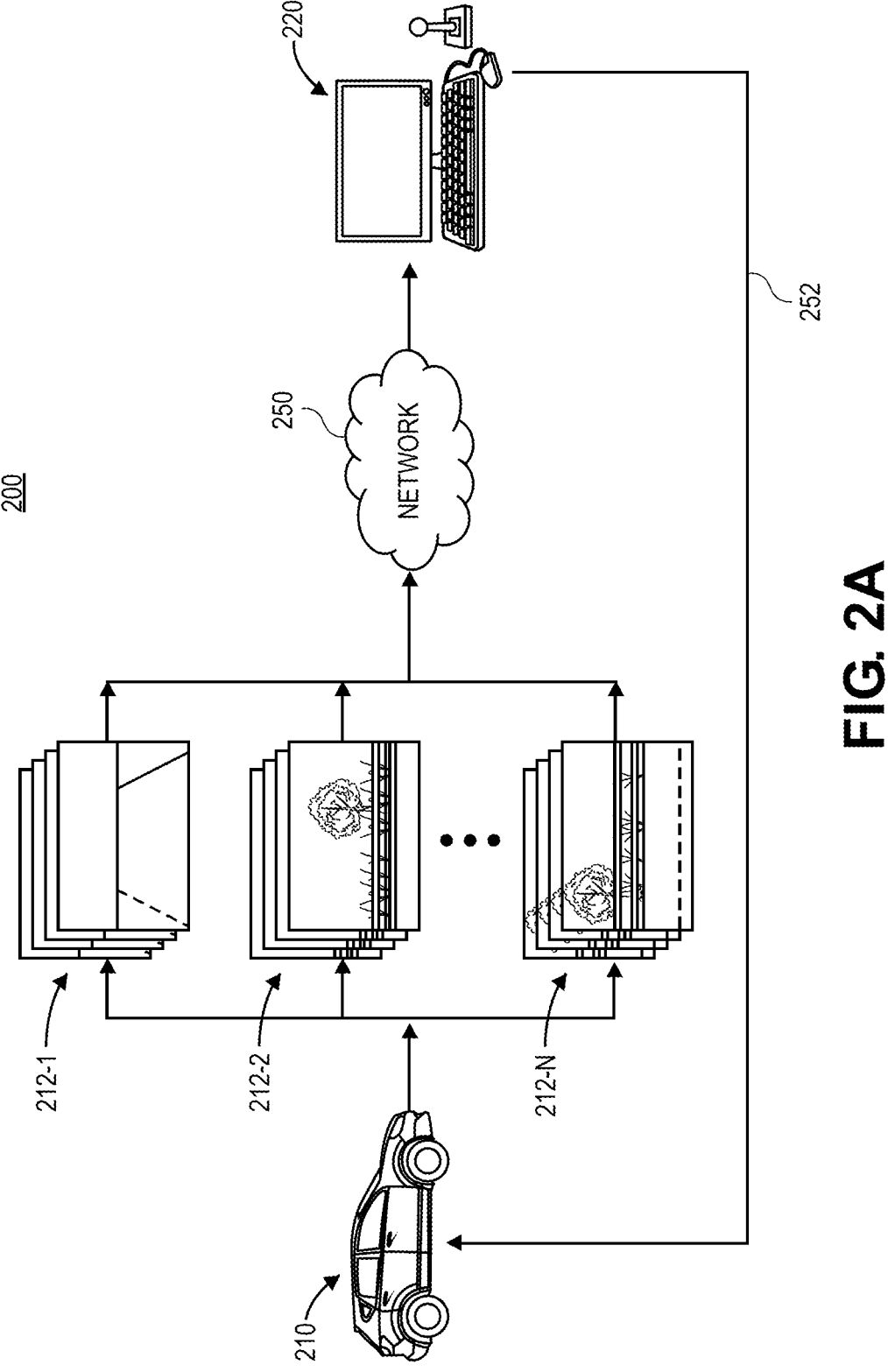
FIGS. 2A and 2B are block diagrams illustrating an exemplary system, according to exemplary embodiments of the present disclosure.
Figure 2B:
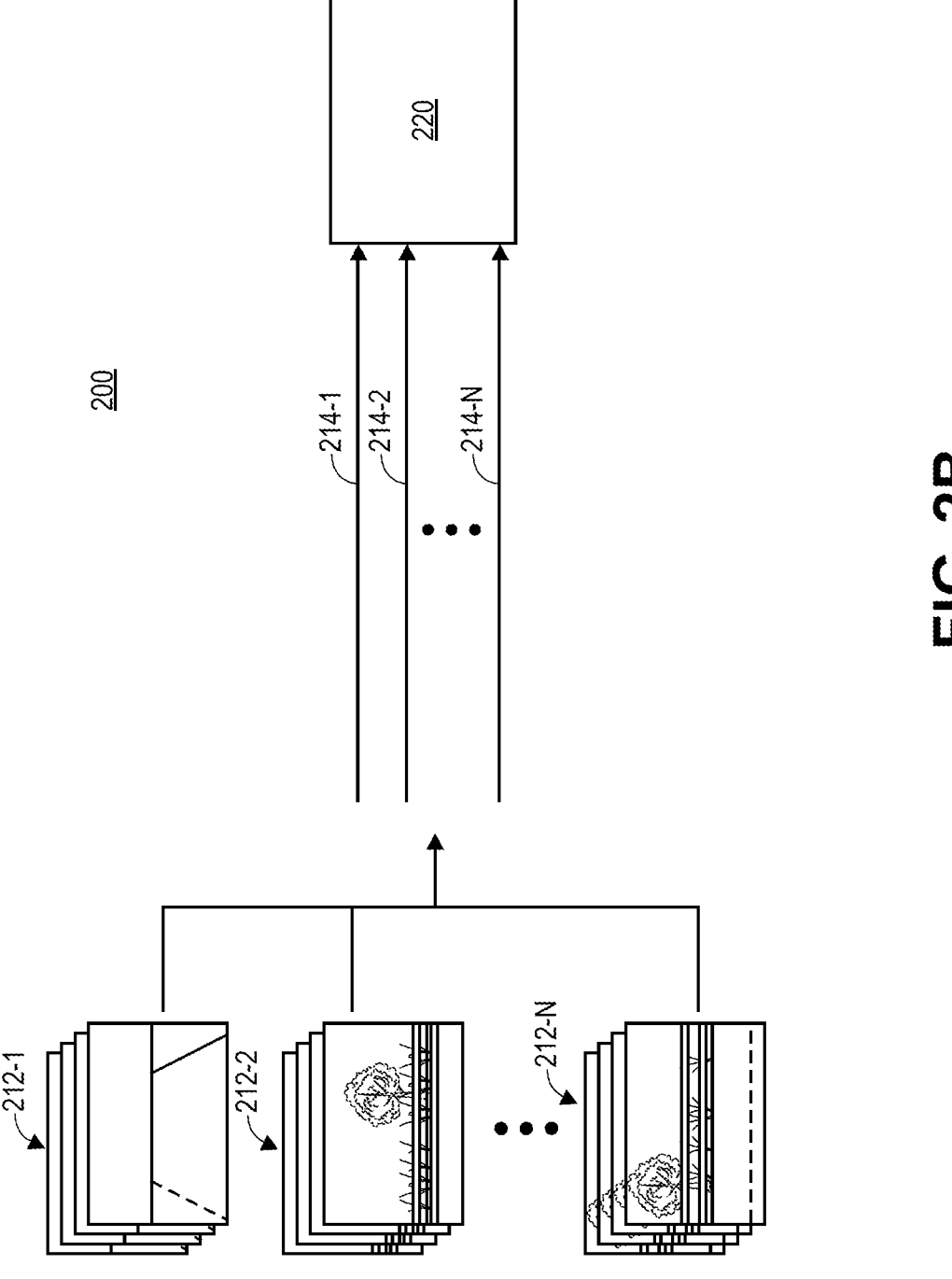

FIGS. 2A and 2B are block diagrams illustrating an exemplary system 200, according to exemplary embodiments of the present disclosure. Exemplary system 200 illustrated in FIGS. 2A and 2B may represent a system configured to select one or more paths for the transmission of data packets from a first device (e.g., a vehicle, etc.) to a second device (e.g., a computing resource and/or remote driving terminal, etc.), according to exemplary embodiments of the present disclosure.

As shown in FIGS. 2A and 2B, exemplary system 200 may include vehicle 210, which may transmit data packets 212 (e.g., data packets 212-1, 212-2 through 212-N), via paths 214 (e.g., paths 214-1, 241-2, through 214-N) of network 250, to computing resource 220. According to exemplary implementations of the present disclosure, data packets 212 may include data streams corresponding to images, video, and/or other information captured by imaging devices, cameras, sensors, and the like associated with vehicle 210 that are transmitted to computing resource 220 (e.g., a remote driving terminal, etc.), via network 250, to facilitate remote operation of vehicle 210. In an exemplary implementation, data packets 212 are sent from vehicle 210 to computing resource 220 to facilitate remote operation of vehicle 210 by a user operating computing resource 220.

In connection with the transmission of data packets 212, exemplary embodiments of the present disclosure may provide for the selection of one or more paths 214 of network 250, via which data packets 212 may be transmitted. For example, exemplary embodiments of the present disclosure may employ a token bucket technique in selecting one or more paths 214 on which to transmit data packets 212 by adaptively modifying a redundancy of data packets 212 being transmitted via the transmission paths of network 250 in view of current network parameters being experienced by network 250, so as to load balance data packets 212 between one or more paths 214 to avoid saturation and/or congestion of network 250, while also ensuring redundancy of data packets 212 and maintaining the data rate of the data stream. For example, the selection of one or more paths 214 may be based on current network information and/or parameters, such as a congestion indicator, the amount of data in flight (e.g., data that has been sent but not yet received), a data rate of the incoming data (e.g., a bitrate or byte-rate of the data streams) received from the various imaging devices, cameras, sensors, and the like, and a feedback period (e.g., the time between feedback received from computing resource 220 regarding receipt of data). The current network information and/or parameters may be used to determine refill rates of path token buckets associated with each path 214 (as well as a global token bucket) and may be periodically provided by computing system 2202 to vehicle 210 via feedback loop 252 to ensure that vehicle 210 has current network information and/or parameters. Further, the periodically received updated network information and/or parameters may be used to update the refill rates of the token buckets. Optionally, an alpha filter may be applied to the network information and/or parameters or the refill rates, so as to provide smoothed values and avoid large fluctuations in the refill rates.

In exemplary implementations of the present disclosure that employ a token bucket technique, a global token bucket for all paths 214 and a path token bucket for each path 214 may first be initialized. After initialization of the token buckets, network parameters, such as a data rate for the data stream, a congestion value (e.g., congestion window, etc.), a data in flight value, a feedback period, and the like, may be received from computing resource 220 and used to determine a refill rate for each path token bucket associated with each path 214. In exemplary implementations, the path token bucket refill rates determined using these network parameters may represent a redundancy capacity for each path 214. Further, the refill rates for paths 214 may be summed to determine a global redundancy refill rate for a global token bucket across all paths 214. The path token buckets for each path 214, as well as the global token bucket, may be refilled according to their respective refill rates, and one or more of paths 214 may be selected for transmitting data packets 212 based on the path token bucket values and the global token bucket. Accordingly, data packets 212 may be transmitted on each of the selected paths 214.

After transmission of data packets 212 on the selected paths 214, the path token bucket values of the selected paths 214 and the global token bucket may be updated in view of the transmission of data packets 212. After the path token bucket values of the selected paths 214 and the global token bucket are updated, the path token buckets for each path 214, as well as the global token bucket, may again be refilled according to their respective refill rates in preparation of the selection of one or more paths for the next transmission of packets. Accordingly, the refilling of the path token bucket values and the global token bucket, selection of one or more paths 214 for transmission of data packets 212 of the data stream, and updating of the path token bucket values of the selected paths 214 and the global token bucket may be continuously performed in connection with the transmission of data packets 212, so as to avoid saturation and/or alleviate congestion of network 250 while also maintaining the data rate of the data stream and redundancy of the packets being transmitted. Further, the refill rates may be periodically updated, as network conditions may change in view of the current network information that is periodically and continuously provided as feedback to vehicle 210 from computing resource 220.

According to certain aspects of the present disclosure, redundancy capping techniques may also be applied, so as to limit network costs, facilitate scaling, and the like, in connection with the selection of one or more paths 214 of network 250. Such a scenario may be experienced by vehicle 210 in areas where there may be strong network cover and/or limited/low network usage. Accordingly, in such implementations, the global token bucket may be capped to a predetermined threshold. Additionally, the token bucket values may not be refilled if the token bucket values for any of the paths is above a predetermined credit limit. Limiting the redundancy and/or refilling of token buckets above a credit limit can ensure a minimum redundancy and effective load balancing of the data stream across the paths of the data link.

Further, in scenarios where there is a degradation and/or congestion of network 250, data rate adaptation techniques may also be employed in connection with the selection of one or more paths of the network link in view of network conditions. Such a scenario may be experienced by vehicle 210 where network 250 may include poor network coverage and/or heavy network usage. For example, in situations where network conditions do not permit a desired redundancy in connection with the data stream, the data rate of the data stream may be adjusted (e.g., lowered, etc.) to compensate for the degraded network conditions. Additionally, exemplary implementations of the present disclosure also provide for adjusting the data rate (e.g., increasing, etc.) as network conditions improve. Further, the data rate may have maximum and minimum thresholds, so as to prevent the data rate from being below or above threshold values, and the adjustments to the data rate may be smoothed and/or filtered, so as to avoid large swings in the data rate.

Figure 3:
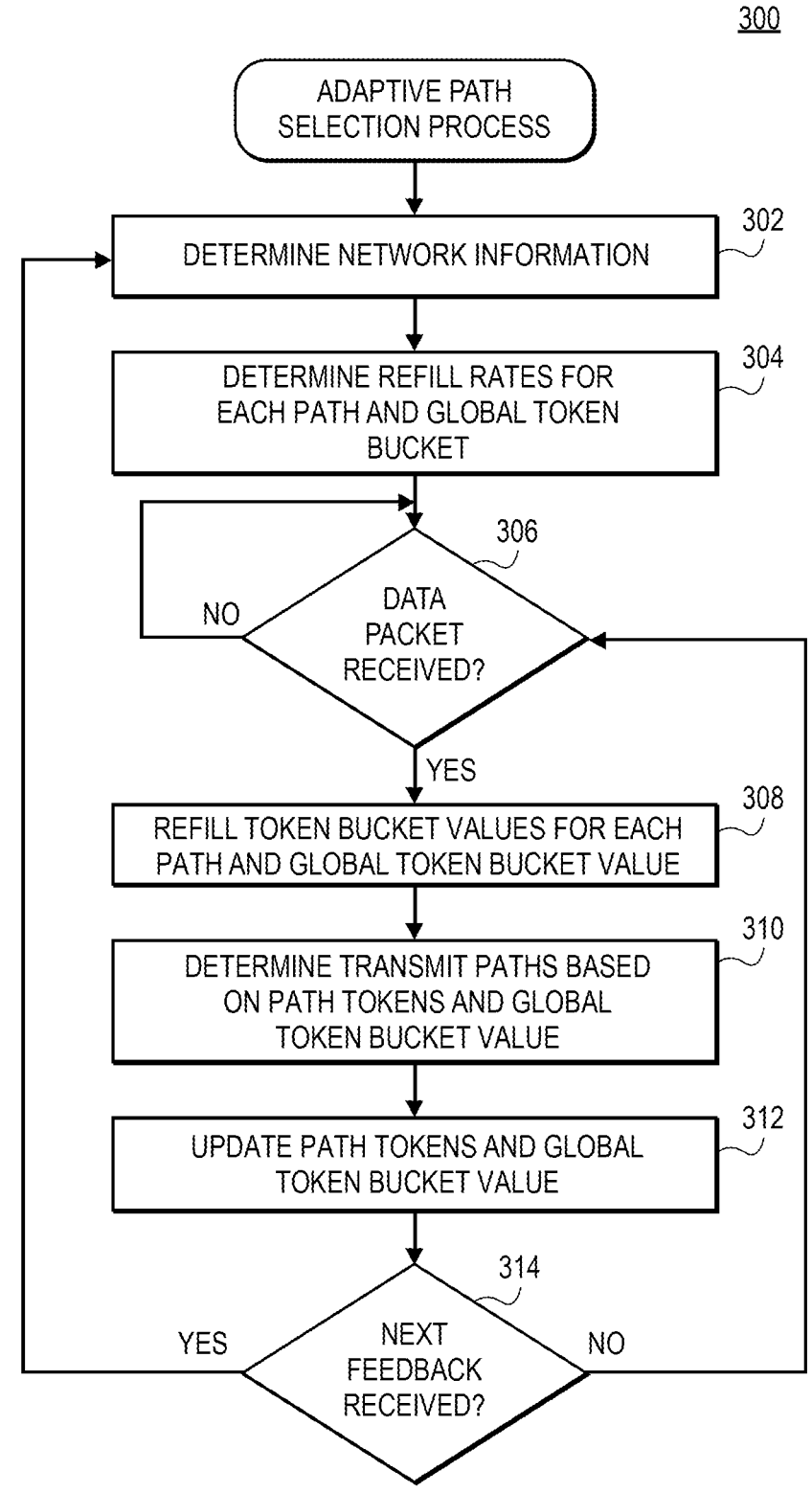
FIG. 3 is a flow diagram of an exemplary adaptive path selection process, according to exemplary embodiments of the present disclosure.

FIG. 3 is a flow diagram of an exemplary adaptive path selection process 300, according to exemplary embodiments of the present disclosure. According to exemplary embodiments of the present disclosure, adaptive path selection process 300 may be performed in connection with the selection of one or more data paths for the transmission of data packets forming a data stream that includes images, video, and/or other information captured by imaging devices, cameras, sensors, etc. of a vehicle that is being remotely operated.

As shown in FIG. 3, exemplary adaptive path selection process 300 may begin at step 302, where network information may be determined and/or obtained. According to exemplary embodiments of the present disclosure, network information such as a data rate for the data stream, a congestion value (e.g., congestion window, etc.), a data in flight value, a feedback period, and the like, may be determined and/or obtained for each path. For example, the data rate may be determined based on the data stream being captured by the imaging devices, cameras, sensors, etc. of a vehicle that is being remotely operated, a congestion value (e.g., congestion window, etc.) may be determined based on timing associated with previously sent packets, a data in flight value may be determined based on feedback received regarding the receipt of previously sent packets, and the feedback period may be determined based on the timing associated with when feedback is received based on previously sent packets.

After the network information has been determined and/or obtained, in exemplary implementations of the present disclosure that employs a token bucket technique (e.g., a token bucket for each candidate path), refill rates may be determined for the path token buckets associated with each path, as well as for a global token bucket, as in step 304. For example, the refill rate for each path may represent a redundancy capacity and/or a margin that is available before the path becomes congested for each respective path and a refill rate for the global token bucket across all paths may be a sum of the refill rates for all paths (e.g., a global redundancy value). According to exemplary embodiments of the present disclosure, the refill rate for each path token bucket for each available path may be represented as:

$$\text{refill rate} = \frac{\text{Congestion}-\text{Data}_{Flight}}{\text{Data Rate}*\text{Feedback Period}}$$

where Congestion may represent a congestion value, such as a congestion window, DataFlight may represent data in flight (e.g., expressed as bits, bytes, etc.), Data Rate may represent the data rate of the incoming data stream (e.g., expressed as a bitrate, a byte-rate, etc.), and Feedback Period may represent a time between feedback that is received.

In step 306, it may be determined if a data packet is received. Accordingly, if a data packet is not received, process 300 continues to loop until a data packet is received. Once a data packet is received, in step 308, the path token bucket values for each path and the global token bucket may be refilled according to their respective refill rates. For example, the corresponding refill rates may be added to the value of the path token buckets corresponding to each available path and the global token bucket.

After the token bucket values have been refilled, in step 310, one or more of the available paths are selected to determine the transmission paths based on the path token bucket values and the global token bucket. For example, the N number of paths having the greatest token bucket values may be selected, where N refers to a floor integer value of the global token bucket. Accordingly, in an exemplary implementation where the global redundancy value is 3.7, the three transmission paths having the highest path token bucket values may be selected. After selection of one or more paths, data packets may be transmitted on the selected paths.

In step 312, after transmission of the packets, the path token bucket values for the selected paths and the global token bucket may be updated. For example, the path token bucket values for each selected path may be subtracted by one (e.g., to represent the transmitted packet) and the global token bucket may be subtracted by the total number of transmitted packets across all selected paths. Continuing the above example where three transmission paths were selected and three packets were transmitted, the path token bucket values for each selected path on which a packet was transmitted may be subtracted by one and the global token bucket value may be subtracted by three.

In step 314, it may then be determined if the current feedback period has completed with the receipt of the next feedback information. In the event that the next feedback has not been received, exemplary adaptive path selection process 300 returns to step 308. Alternatively, adaptive selection process 300 returns to step 302, so as to determine and/or obtain updated current network information, which may be used to determine updated refill rates and an updated global redundancy value.

FIGS. 4A and 4B are exemplary tables 400 and 450 illustrating exemplary path token bucket values and global token bucket values, in accordance with exemplary embodiments of the present disclosure.

As shown in FIG. 4A, table 400 may present hypothetical values for path token buckets and a global token bucket used in connection with determining paths for transmitting packets of a data stream in an exemplary implementation of the present disclosure. In the illustrated implementation, four paths are available (e.g., Path 0, Path 1, Path 2, and Path 3) for transmitting packets of the data stream, and the network information and/or parameters utilized to determine the refill rates of the path token buckets and the global token bucket include a congestion indicator (e.g., a congestion window), a data in flight value, a data rate of the incoming data stream, and a feedback period. In the exemplary implementation illustrated in FIG. 4A, the current network information and/or parameters may indicate an input data stream rate of 8 Mb/s, a feedback period of 50 ms, and that each round (N) shown in table 400 is within a single feedback period. Further, the current network information and/or parameters may further indicate a difference between the congestion value and a data in flight value to be 25 KB for Path 0, 30 KB for Path 1, 75 KB for Path 2, and 15 KB for Path 3. Applying the network information and/or parameters to the following refill rate formula:

$$\text{refill rate} = \frac{\text{Congestion}-\text{Data}_{Flight}}{\text{Data Rate}*\text{Feedback Period}}$$

a refill rate for Path 0 may be determined to be 0.5, a refill rate for Path 1 may be determined to be 0.6, a refill rate for Path 2 may be determined to be 1.0, and a refill rate for Path 3 may be determined to be 0.3. The refill rate for each path may represent a margin (e.g., a number of packets that may be sent) before the path is saturated. Further, summing the refill rates for all the paths may determine a global token bucket refill rate of 2.4, which may be added to the global redundancy value to obtain a refilled global redundancy value of 2.9 (e.g., 0.5+2.4).

As shown in FIG. 4A, in connection with Round N=0, the token bucket values for each path may be refilled by their corresponding refill rates. Accordingly, the refill rate of 0.5 for Path 0 may be added to the token bucket value for Path 0, the refill rate of 0.6 for Path 1 may be added to the token bucket value for Path 1, the refill rate of 1.0 for Path 2 may be added to the token bucket value for Path 2, and the refill rate of 0.3 for Path 3 may be added to the token bucket value for Path 3. In connection with Round N=0, prior to refilling the token bucket values for each path with the corresponding refill rates, each token bucket may have been initialized with an initial value of 0.5. For example, the initial value may be an average target redundancy value based on the number of paths. In the exemplary implementation, the initial value of 0.5 may correspond to a target redundancy value of 2.0 divided by the number of available paths (4), which yields the initial value of 0.5 for each path.

In connection with Round N=0, refilling each token bucket value for Path 0, Path 1, Path 2, and Path 3 may yield a token bucket value of 1.0 for Path 0, a token bucket value of 1.1 for Path 1, a token bucket value of 1.5 for Path 2, and a token bucket value of 0.8 for Path 3. After the refilled token bucket values have been determined for each path, the number of paths to be selected for transmitting packets may be determined by the global token bucket. As shown in FIG. 4A, the floor integer value of the global token bucket may be used to determine the number of paths to be selected. Accordingly, for Round N=0, two paths (e.g., $\lfloor 2.9 \rfloor$=2) may be selected from Path 0, Path 1, Path 2, and Path 3 for transmitting packets of the data stream in Round N=0. In selecting the paths for transmitting packets of the data stream, the paths with the highest associated token bucket values may be selected. Accordingly, as shown in FIG. 4A, the two paths with the highest token bucket values, namely Path 1 and Path 2, which have token bucket values of 1.1 and 1.5, respectively, are selected as the transmission paths for Round N=0. After transmission of the packets on Path 1 and Path 2, the token bucket values for the paths on which packets were transmitted, as well as the global token bucket are updated. Accordingly, one is subtracted from the token bucket values associated with Path 1 and Path 2 to obtain updated token bucket values of 0.1 and 0.5, respectively, and two is subtracted from the global token bucket value, to obtain an updated global redundancy value of 0.9.

The updated token bucket values and updated global redundancy value are used to determine the paths in the next round. Further, prior to the selection of paths in the next round, it may be determined whether the feedback period has expired, and feedback information has been received with updated network information and/or parameters. In situations where feedback information has been received providing updated network information and/or parameters, updated refill rates may be determined based on the updated network information and/or parameters. Otherwise, the selection of paths may be performed with the previously determined refill rates based on the previous network information and/or parameters.

As illustrated in FIG. 4A, after the selection of Path 1 and Path 2 and updating of the token bucket values and global redundancy value in Round N=0, the updated token bucket values are refilled using the refill values for Round N=1.

Accordingly, the corresponding refill rates are added to the updated token bucket values from Round N=0. As illustrated, the refill rate of 0.5 for Path 0 may be added to the token bucket value of 1.0 for Path 0 to obtain a refilled token bucket value of 1.5 for Path 0, the refill rate of 0.6 for Path 1 may be added to the token bucket value of 0.1 for Path 1 to obtain a refilled token bucket value of 0.7, the refill rate of 1.0 for Path 2 may be added to the token bucket value of 0.5 for Path 2 to obtain a refilled token bucket value of 1.5, and the refill rate of 0.3 for Path 3 may be added to the token bucket value of 0.8 for Path 3 to obtain a refilled token bucket value of 1.1 for Path 3. The global token bucket refill rate of 2.4 (e.g., the sum of the token bucket value refill rates −0.5+0.6+1.0+0.3=2.4) is added to the updated global token bucket value to obtain a refilled global redundancy value of 3.3.

After the path token bucket values have been refilled, the number of paths to be selected for transmitting packets may be determined by the global redundancy value. As shown in FIG. 4A, the floor integer value of the global token bucket value may be used to determine the number of paths to be selected. Accordingly, for Round N=1, three paths (e.g., $\lfloor 3.3 \rfloor$=3) may be selected from Path 0, Path 1, Path 2, and Path 3 for transmitting packets of the data stream in Round N=1. In selecting the paths for transmitting packets of the data stream, the paths with the highest associated token bucket values may be selected. Accordingly, as shown in FIG. 4A, the three paths with the highest token bucket values, namely Path 0, Path 2, and Path 3, which have token bucket values of 1.5, 1.5, and 1.1, respectively, are selected as the transmission paths for Round N=1. After transmission of the packets on Path 0, Path 2, and Path 3, the path token bucket values for the paths on which the packets were transmitted, as well as the global token bucket value are updated. Accordingly, one is subtracted from the token bucket values associated with Path 0, Path 2, and Path 3 to obtain updated token bucket values of 0.5, 0.5, and 0.1, respectively, and three is subtracted from the global token bucket value, to obtain an updated global redundancy value of 0.3.

The updated token bucket values and updated global token bucket value are then used to determine paths in the next round. Further, prior to the selection of paths in the next round, it may be determined whether the feedback period has expired, and feedback information has been received providing updated network information and/or parameters. In situations where feedback information providing updated network information and/or parameters has been received, updated refill rates may be determined based on the updated network information and/or parameters. Otherwise, the selection of paths may be performed with the previously determined refill rates based on the previous network information and/or parameters.

As illustrated in FIG. 4A, after the selection of Path 0, Path 2, and Path 3 and updating of the path token bucket values and global token bucket value in Round N=1, the updated path token bucket values are refilled using the refill values for Round N=2. Accordingly, the corresponding refill rates are added to the updated path token bucket values from Round N=1. As illustrated, the refill rate of 0.5 for Path 0 may be added to the token bucket value of 0.5 for Path 0 to obtain a refilled token bucket value of 1.0 for Path 0, the refill rate of 0.6 for Path 1 may be added to the token bucket value of 0.7 for Path 1 to obtain a refilled token bucket value of 1.3, the refill rate of 1.0 for Path 2 may be added to the token bucket value of 0.5 for Path 2 to obtain a refilled token bucket value of 1.5, and the refill rate of 0.3 for Path 3 may be added to the token bucket value of 0.1 for Path 3 to obtain a refilled token bucket value of 0.4 for Path 3. The global token bucket refill rate of 2.4 (e.g., the sum of the token bucket value refill rates −0.5+0.6+1.0+0.3=2.4) is added to the updated global token bucket value to obtain a refilled global redundancy value of 2.7.

After the path token bucket values have been refilled, the number of paths to be selected for transmitting packets may be determined by the global token bucket value. As shown in FIG. 4A, the floor integer value of the global token bucket value may be used to determine the number of paths to be selected. Accordingly, for Round N=2, two paths (e.g., $|2.7|=2$) may be selected from Path 0, Path 1, Path 2, and Path 3 for transmitting packets of the data stream in Round N=2. In selecting the paths for transmitting packets of the data stream, the paths with the highest associated token bucket values may be selected. Accordingly, as shown in FIG. 4A, the two paths with the highest token bucket values, namely Path 1 and Path 2, which have token bucket values of 1.3 and 1.5, respectively, are selected as the transmission paths for Round N=2. After transmission of the packets on Path 1 and Path 2, the token bucket values for the paths on which the packets were transmitted, as well as the global token bucket value are updated. Accordingly, one is subtracted from the token bucket values associated with Path 1 and Path 2 to obtain updated token bucket values of 0.3 and 0.5, respectively, and two is subtracted from the global redundancy value, to obtain an updated global redundancy value of 0.7.

As illustrated in FIG. 4A, paths may continue to be iteratively selected by refilling the path token bucket values for each path and the global token bucket value, selecting one or more paths based on the refilled path token bucket values and the refilled global token bucket value, and updating the path token bucket values associated with paths on which the packets were transmitted and the global token bucket value. Table 400 continues the above exemplary implementation of Rounds N=3 through N=9, with the assumption that no new feedback information is received between any of the rounds and the refill rates remain the same for each of Rounds N=3 through N=9.

FIG. 4B illustrates table 450, which may present hypothetical values for path token buckets and a global token bucket used in connection with determining paths for transmitting packets of a data stream in an exemplary implementation of the present disclosure. In the illustrated implementation, four paths are available (e.g., Path 0, Path 1, Path 2, and Path 3) for transmitting packets of the data stream, and the network information and/or parameters utilized to determine the refill rates of the path token buckets and the global token bucket include a congestion indicator (e.g., a congestion window), a data in flight value, a data rate of the incoming data stream, and a feedback period.

The exemplary implementation illustrated in FIG. 4B may be representative of a situation where there are poor network conditions (e.g., poor network coverage, the network is congested, etc.) are being experienced. Accordingly, the current network information and/or parameters may indicate a refill rate for Path 0 of 0.1, a refill rate for Path 1 of 0.2, a refill rate for Path 2 of 0.4, and a refill rate for Path 3 of 0.1, where the refill rates may be obtained by applying the network information and/or parameters to the following refill rate formula:

$$\text{refill rate} = \frac{\text{Congestion} - \text{Data}_{Flight}}{\text{Data Rate} * \text{Feedback Period}}$$

The refill rate for each path may represent a margin (e.g., a number of packets that may be sent) before the path is saturated. Further, summing the refill rates for all the paths may determine a global token bucket refill rate of 0.8, which may be added to the global redundancy value to obtain a refilled global redundancy value of 1.3 (e.g., 0.5+0.8).

As shown in FIG. 4B, in connection with Round N=0, the token bucket values for each path may be refilled by their corresponding refill rates. Accordingly, the refill rate of 0.1 for Path 0 may be added to the token bucket value for Path 0, the refill rate of 0.2 for Path 1 may be added to the token bucket value for Path 1, the refill rate of 0.4 for Path 2 may be added to the token bucket value for Path 2, and the refill rate of 0.1 for Path 3 may be added to the token bucket value for Path 3. In connection with Round N=0, prior to refilling the token bucket values for each path with the corresponding refill rates, each token bucket may have been initialized with an initial value of 0.5. For example, the initial value may be an average target redundancy value based on the number of paths. In the exemplary implementation, the initial value of 0.5 may correspond to a target redundancy value of 2.0 divided by the number of available paths (4), which yields the initial value of 0.5 for each path.

In connection with Round N=0, refilling each token bucket value for Path 0, Path 1, Path 2, and Path 3 may yield a token bucket value of 0.6 for Path 0, a token bucket value of 0.7 for Path 1, a token bucket value of 0.9 for Path 2, and a token bucket value of 0.6 for Path 3. After the refilled token bucket values have been determined for each path, the number of paths to be selected for transmitting packets may be determined by the global token bucket. As shown in FIG. 4B, the floor integer value of the global token bucket may be used to determine the number of paths to be selected. Accordingly, for Round N=0, one path (e.g., $|1.3|=2$) may be selected from Path 0, Path 1, Path 2, and Path 3 for transmitting packets of the data stream in Round N=0. In implementations where the global token bucket is less than one, the global token bucket may be set to one to ensure selection of at least one path and transmission of the data path on the selected at least one path.

In selecting the paths for transmitting packets of the data stream, the path with the highest associated token bucket values may be selected. Accordingly, as shown in FIG. 4B, although none of the token buckets exceeds 1, the path with the highest token bucket value, namely Path 2, which has a token bucket value of 0.9, is selected as the transmission path for Round N=0. After transmission of the packet on Path 2, the token bucket value for the path on which the packets were transmitted, as well as the global token bucket are updated. Accordingly, one is subtracted from the token bucket values associated with Path 2 to obtain an updated token bucket value −0.1, and one is subtracted from the global token bucket value, to obtain an updated global redundancy value of 0.3.

The updated token bucket values and updated global redundancy value are used to determine the paths in the next round. Further, prior to the selection of paths in the next round, it may be determined whether the feedback period has expired, and feedback information has been received with updated network information and/or parameters. In situations where feedback information has been received providing updated network information and/or parameters, updated refill rates may be determined based on the updated network information and/or parameters. Otherwise, the selection of paths may be performed with the previously determined refill rates based on the previous network information and/or parameters.

As illustrated in FIG. 4B, after the selection of Path 2 and updating of the token bucket value and global redundancy value in Round N=0, the updated token bucket values are refilled using the refill values for Round N=1. Accordingly, the corresponding refill rates are added to the updated token bucket values from Round N=0. As illustrated, the refill rate of 0.1 for Path 0 may be added to the token bucket value of 0.6 for Path 0 to obtain a refilled token bucket value of 0.7 for Path 0, the refill rate of 0.2 for Path 1 may be added to the token bucket value of 0.7 for Path 1 to obtain a refilled token bucket value of 0.9, the refill rate of 0.4 for Path 2 may be added to the token bucket value of –0.1 for Path 2 to obtain a refilled token bucket value of 0.3, and the refill rate of 0.1 for Path 3 may be added to the token bucket value of 0.6 for Path 3 to obtain a refilled token bucket value of 0.7 for Path 3. The global token bucket refill rate of 0.8 (e.g., the sum of the token bucket value refill rates –0.1+0.2+0.4+ 0.1=0.8) is added to the updated global token bucket value to obtain a refilled global redundancy value of 1.1.

After the path token bucket values have been refilled, the number of paths to be selected for transmitting packets may be determined by the global redundancy value. As shown in FIG. 4B, the floor integer value of the global token bucket value may be used to determine the number of paths to be selected. Accordingly, for Round N=1, one path (e.g., |1.1|=1) may be selected from Path 0, Path 1, Path 2, and Path 3 for transmitting packets of the data stream in Round N=1. In selecting the paths for transmitting packets of the data stream, the path with the highest associated token bucket value may be selected. Accordingly, as shown in FIG. 4B, the path with the highest token bucket value, namely Path 1, which has a token bucket value of 0.9 is selected as the transmission path for Round N=1. As shown in FIG. 4B, although none of the token bucket values exceeds one, the path with the highest token bucket value, namely Path 1, which has a token bucket value of 0.9, is selected as the transmission path for Round N=0 to ensure selection of at least one path and transmission of the data path on the selected at least one path.

After transmission of the packets on Path 1, the path token bucket value for the path on which the packet was transmitted, as well as the global token bucket value are updated. Accordingly, one is subtracted from the token bucket value associated with Path 1 to obtain an updated token bucket value –0.1, and one is subtracted from the global token bucket value, to obtain an updated global redundancy value of 0.1.

The updated token bucket values and updated global token bucket value are then used to determine paths in the next round. Further, prior to the selection of paths in the next round, it may be determined whether the feedback period has expired, and feedback information has been received providing updated network information and/or parameters. In situations where feedback information providing updated network information and/or parameters has been received, updated refill rates may be determined based on the updated network information and/or parameters. Otherwise, the selection of paths may be performed with the previously determined refill rates based on the previous network information and/or parameters.

As illustrated in FIG. 4B, after the selection of Path 1 and updating of the path token bucket values and global token bucket value in Round N=1, the updated path token bucket values are refilled using the refill values for Round N=2. Accordingly, the corresponding refill rates are added to the updated path token bucket values from Round N=1. As illustrated, the refill rate of 0.1 for Path 0 may be added to the token bucket value of 0.7 for Path 0 to obtain a refilled token bucket value of 0.8 for Path 0, the refill rate of 0.2 for Path 1 may be added to the token bucket value of –0.1 for Path 1 to obtain a refilled token bucket value of 0.1, the refill rate of 0.4 for Path 2 may be added to the token bucket value of 0.3 for Path 2 to obtain a refilled token bucket value of 0.7, and the refill rate of 0.1 for Path 3 may be added to the token bucket value of 0.7 for Path 3 to obtain a refilled token bucket value of 0.8 for Path 3. The global token bucket refill rate of 0.8 (e.g., the sum of the token bucket value refill rates –0.1+0.2+0.4+0.1=0.8) is added to the updated global token bucket value to obtain a refilled global redundancy value of 0.9. As shown, although the global redundancy value is less than one, the global token bucket may be set to one to ensure selection of at least one path and transmission of the data path on the selected at least one path.

After the path token bucket values have been refilled, the number of paths to be selected for transmitting packets may be determined by the global token bucket value. As shown in FIG. 4B, the floor integer value of the global token bucket value may be used to determine the number of paths to be selected. Accordingly, for Round N=2, one path (e.g., |1.0|=1) may be selected from Path 0, Path 1, Path 2, and Path 3 for transmitting packets of the data stream in Round N=2. In selecting the path for transmitting packets of the data stream, the path with the highest associated token bucket values may be selected. Accordingly, as shown in FIG. 4B, the path with the highest token bucket value, namely either Path 0 or Path 3, which both have token bucket values of 0.8, may be selected as the transmission path for Round N=2. After transmission of the packets on either Path 0 or Path 3, the token bucket value for the path on which the packets were transmitted, as well as the global token bucket value are updated. Accordingly, one is subtracted from the token bucket values associated with the selected path (e.g., Path 0 in the implementation illustrated in FIG. 4B) to obtain updated token bucket value of –0.2, and one is subtracted from the global redundancy value, to obtain an updated global redundancy value of 0.0.

As illustrated in FIG. 4B, paths may continue to be iteratively selected by refilling the path token bucket values for each path and the global token bucket value, selecting one or more paths based on the refilled path token bucket values and the refilled global token bucket value, and updating the path token bucket values associated with paths on which the packets were transmitted and the global token bucket value. As illustrated in FIG. 4B, exemplary embodiments of the present disclosure can continue to facilitate load balancing of the data packet across the "best," least congested path, even in situations of poor network conditions.

Figure 5:
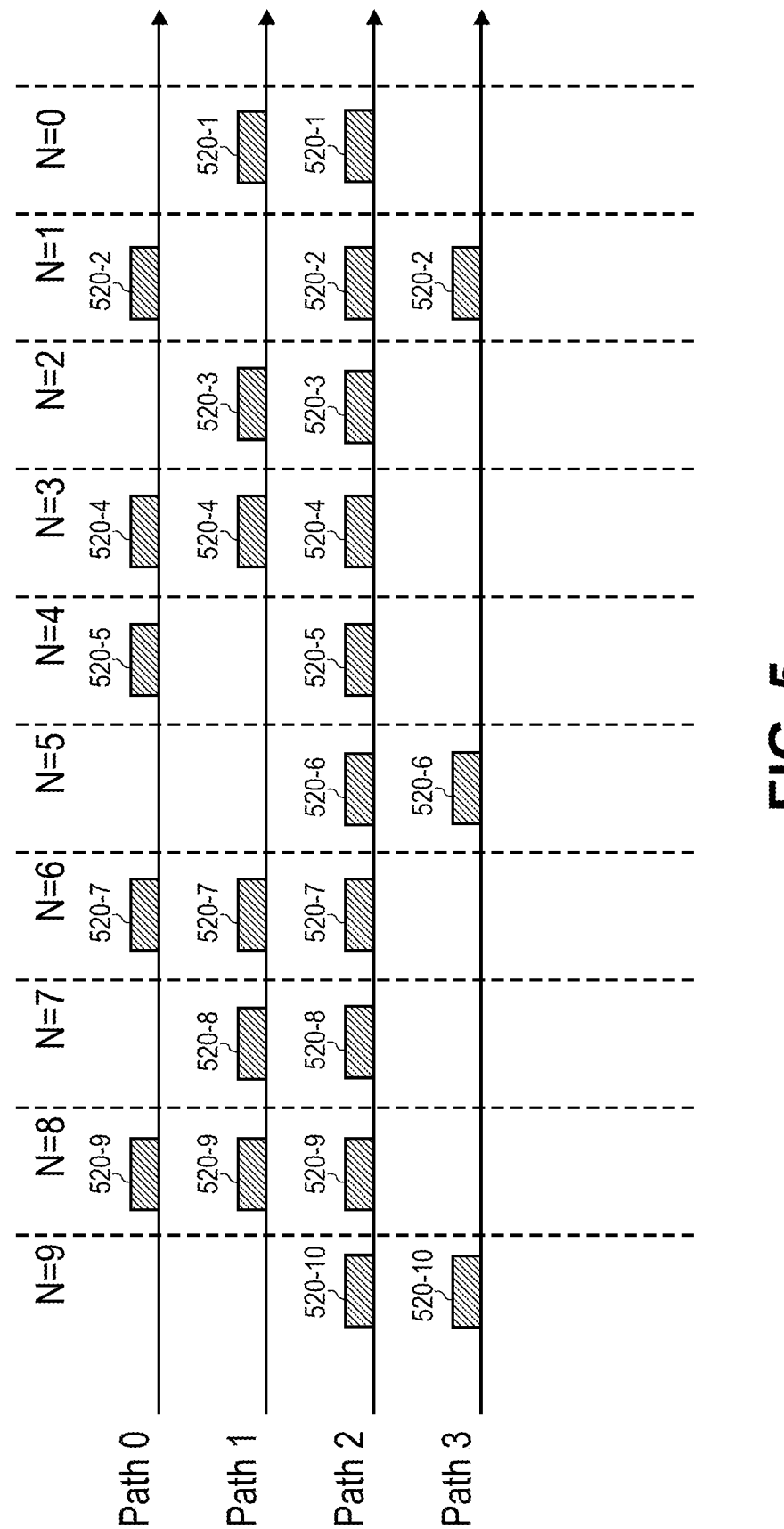
FIG. 5 is a block diagram of an exemplary of network link that corresponds to the selection of paths and transmission of data packets in view of token bucket values detailed in the table illustrated in FIG. 4A, according to exemplary embodiments of the present disclosure.

FIG. 5 is a block diagram of an exemplary network link 500, according to exemplary embodiments of the present disclosure. The block diagram of FIG. 5 corresponds to the selection of paths and transmission of data packets on the selected paths in the exemplary embodiment detailed in FIG. 4A.

As shown in FIG. 5 (and FIG. 4A), during period N=0, Path 1 and Path 2 were selected, based on the refilled path token bucket values and the global token bucket value, and data packets 520-1 were transmitted on selected Path 1 and Path 2. Similarly, during period N=1, Path 0, Path 2, and Path 3 were selected, based on the refilled path token bucket values and the global token bucket value, and data packets 520-2 were transmitted on selected Path 0, Path 2, and Path 3. Additionally, during period N=2, Path 1 and Path 2 were selected, based on the refilled path token bucket values and the global token bucket value, and data packets 520-3 were transmitted on selected Path 1 and Path 2; during period N=3, Path 0, Path 1, and Path 2 were selected, based on the refilled path token bucket values and the global token bucket value, and data packets 520-4 were transmitted on selected Path 0, Path 1, and Path 2; during period N=4, Path 0 and Path 2 were selected, based on the refilled path token bucket values and the global token bucket value, and data packets 520-5 were transmitted on selected Path 0 and Path 2; during period N=5, Path 2 and Path 3 were selected, based on the refilled path token bucket values and the global token bucket value, and data packets 520-6 were transmitted on selected Path 2 and Path 3; during period N=6, Path 0, Path 1, and Path 2 were selected, based on the refilled path token bucket values and the global token bucket value, and data packets 520-7 were transmitted on selected Path 0, Path 1, and Path 2; during period N=7, Path 1 and Path 2 were selected, based on the refilled path token bucket values and the global token bucket value, and data packets 520-8 were transmitted on selected Path 1 and Path 2; during period N=8, Path 0, Path 1, and Path 2 were selected, based on the refilled path token bucket values and the global token bucket value, and data packets 520-9 were transmitted on selected Path 0, Path 1, and Path 2; and during period N=9, Path 2 and Path 3 were selected, based on the refilled path token bucket values and the global token bucket value, and data packets 520-10 were transmitted on selected Path 2 and Path 3.

Figure 6:
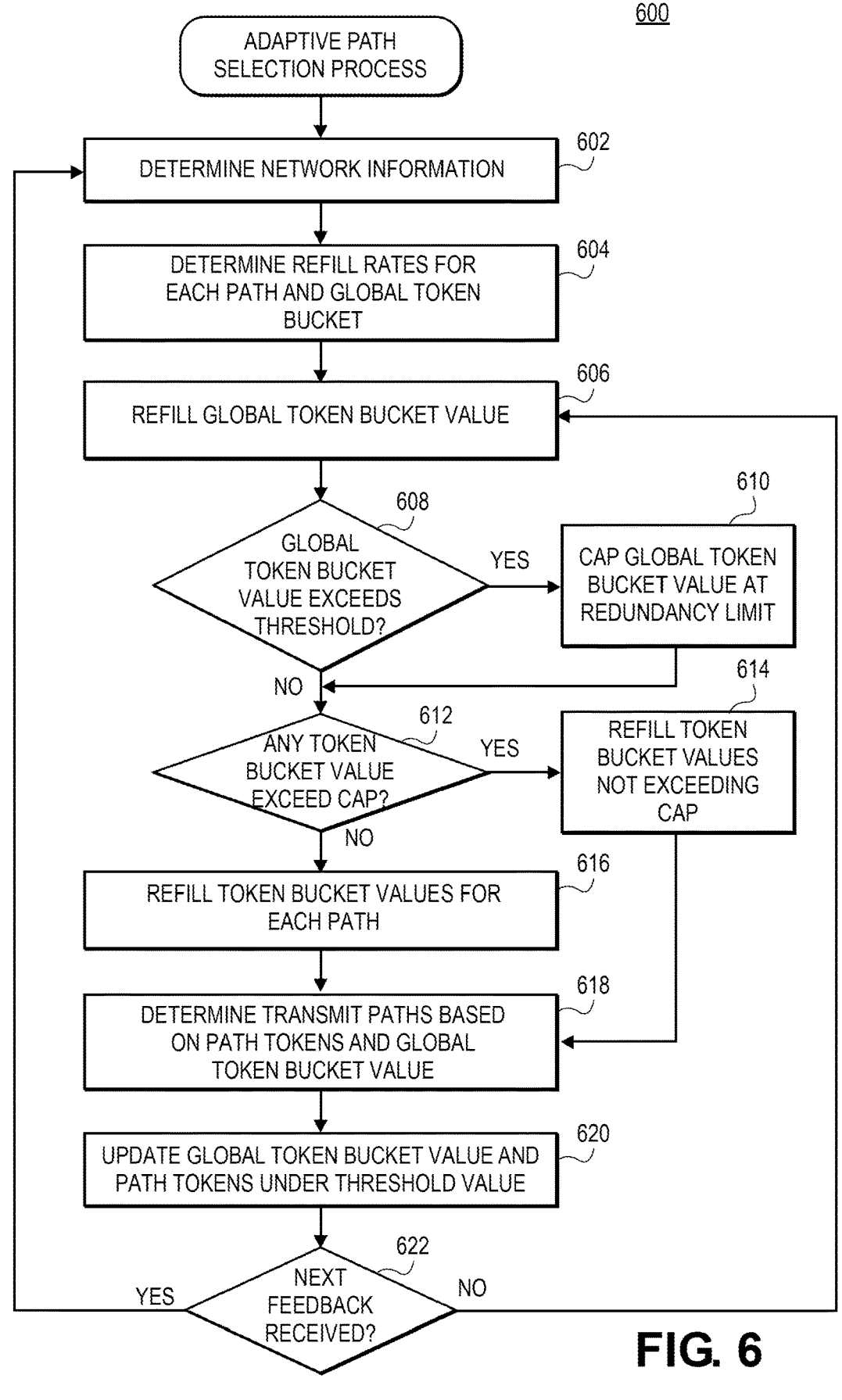
FIG. 6 is a flow diagram of an exemplary adaptive path selection process, according to exemplary embodiments of the present disclosure.

FIG. 6 is a flow diagram of an exemplary adaptive path selection process 600, according to exemplary embodiments of the present disclosure. According to exemplary embodiments of the present disclosure, adaptive path selection process 600 may be performed in connection with the selection of one or more data paths for the transmission of data packets forming a data stream that includes images, video, and/or other information captured by imaging devices, cameras, sensors, etc. of a vehicle that is being remotely operated in circumstances where it may be desirable to limit network costs, facilitate scaling, and the like.

As shown in FIG. 6, exemplary adaptive path selection process 600 may begin at step 602, where network information may be determined and/or obtained. According to exemplary embodiments of the present disclosure, network information such as a data rate for the data stream, a congestion value (e.g., congestion window, etc.), a data in flight value, a feedback period, and the like, may be determined and/or obtained for each candidate path. For example, the data rate may be determined based on the data stream being captured by the imaging devices, cameras, sensors, etc. of a vehicle that is being remotely operated, a congestion value (e.g., congestion window, etc.) may be determined based on timing associated with previously sent packets, a data in flight value may be determined based on feedback received regarding the receipt of previously sent packets, and the feedback period may be determined on the timing associated with when feedback is received based on previously sent packets.

After the network information has been determined and/or obtained, in exemplary implementations of the present disclosure that employs a token bucket technique (e.g., a token bucket for each candidate path), a refill rate may be determined for the path token buckets associated with each path, as well as for a global token bucket, as in step 604. The refill rate for the token bucket associated with each path may represent for example, a redundancy capacity and/or a margin that is available for the path before the path becomes congested. In exemplary implementations, the refill rate for each path may represent a redundancy capacity for each path and the global redundancy refill rate may be a sum of the refill rates for all available paths. According to exemplary embodiments of the present disclosure, the refill rate for each candidate path may be represented as:

$$\text{refill rate} = \frac{\text{Congestion} - \text{Data}_{Flight}}{\text{Data Rate} * \text{Feedback Period}}$$

where Congestion may represent a congestion value, such as a congestion window, DataFlight may represent data in flight (e.g., expressed as bits, bytes, etc.), Data Rate may represent the data rate of the incoming data stream (e.g., expressed as a bitrate, a byte-rate, etc.), and Feedback Period may represent a time between feedback that is received.

In step 606, the global token bucket value may be refilled, according to the respective refill rates. For example, the global token bucket may be refilled by adding the global redundancy refill rate to the global token bucket.

After the global token bucket value has been refilled, in step 608, it may be determined whether the global token bucket value exceeds a threshold value. If the global token bucket value exceeds the threshold value, the global token bucket value may be capped at a redundancy limit value, as in step 610.

In step 612, it may be determined if any of the path token bucket values exceeds a token bucket limit cap. In the event that one or more of the path token bucket values exceeds the token bucket limit cap, only the token bucket values not exceeding the cap are refilled, as in step 614. If none of the path token bucket values exceeds the token bucket limit cap, the token bucket values are refilled for each path, as in step 616.

In step 618, one or more of the candidate paths are selected to determine the transmission paths based on the path token bucket values and the global token bucket value. For example, the N number of paths having the greatest path token bucket value may be selected, where N refers to a floor integer value of the global token bucket value. Accordingly, in an exemplary implementation where the global token bucket value is 3.7, the three transmission paths having the highest path token bucket values may be selected. After selection of one or more paths, data packets may be transmitted on the selected paths.

In step 620, after transmission of the packets, the path token bucket values for the selected paths and the global token bucket value may be updated. For example, the path token bucket values for each selected path may be subtracted by one (e.g., to represent the transmitted packet) and the global token bucket value may be reduced by the total number of transmitted packets. Continuing the above example where three transmission paths were selected and three packets were transmitted, the path token bucket values for each selected path on which a packet was transmitted may be subtracted by one and the global token bucket value may be subtracted by three.

In step 622, it may then be determined if the current feedback period has completed with the receipt of the next feedback information. In the event that the next feedback has not been received, exemplary adaptive path selection process 600 returns to step 606. Alternatively, adaptive selection process 600 returns to step 602, so as to determine and/or obtain updated current network information, which may be used to determine updated refill rates and an updated global redundancy value.

Figure 7:
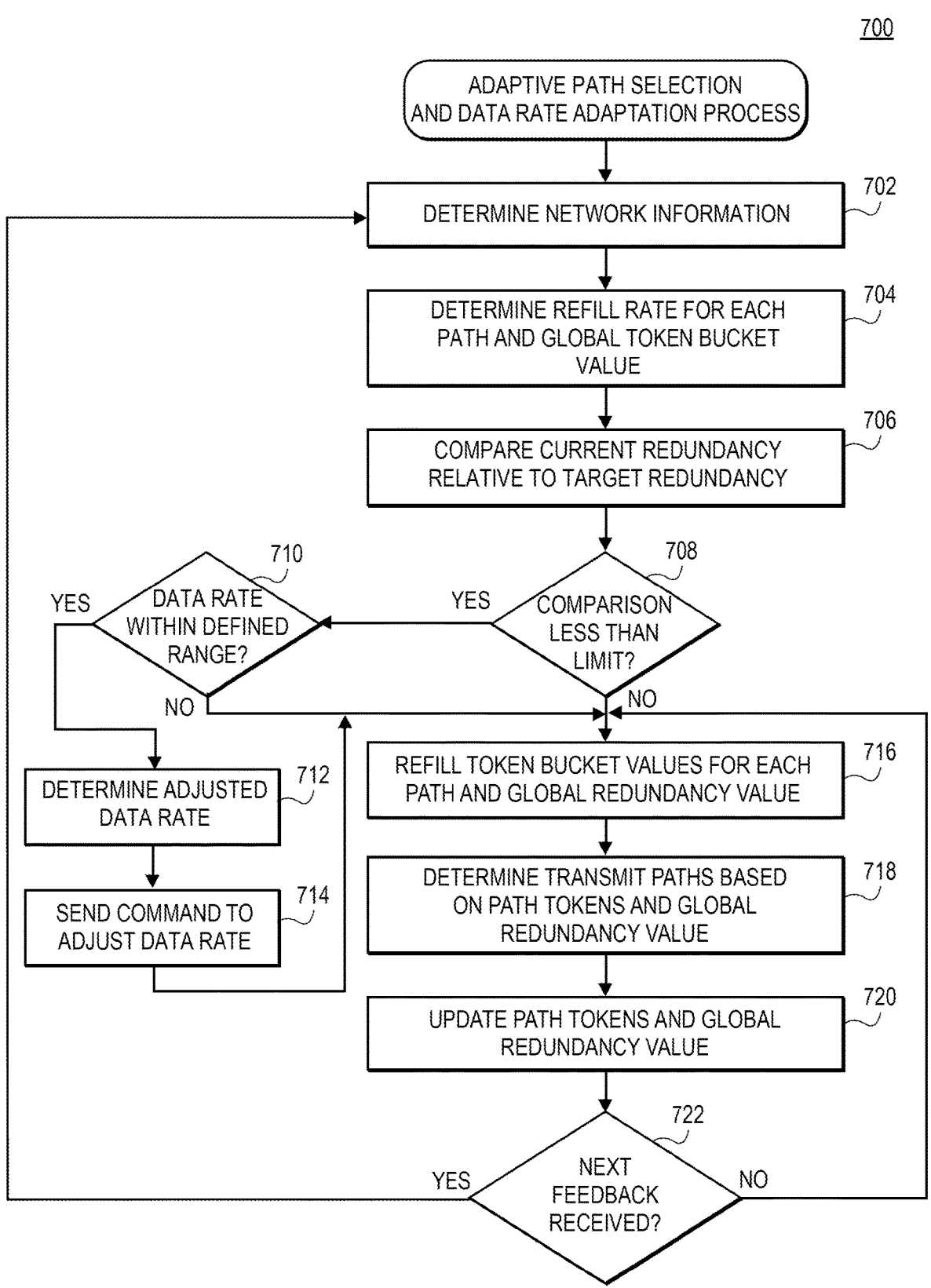
FIG. 7 is a flow diagram of an exemplary adaptive path selection and data rate adaptation process, according to exemplary embodiments of the present disclosure.

FIG. 7 is a flow diagram of an exemplary adaptive path selection and data rate adaptation process 700, according to exemplary embodiments of the present disclosure. According to exemplary embodiments of the present disclosure, adaptive path selection process 700 may be performed to modify and/or adjust the incoming data rate of an incoming data stream in connection with the selection of one or more data paths for the transmission of data packets forming the data stream that includes images, video, and/or other information captured by imaging devices, cameras, sensors, etc. of a vehicle that is being remotely operated in situations where network conditions do not permit a desired redundancy in connection with the data stream.

As shown in FIG. 7, exemplary adaptive path selection process 700 may begin at step 702, where network information may be determined and/or obtained. According to exemplary embodiments of the present disclosure, network information such as a data rate for the data stream, a congestion value (e.g., congestion window, etc.), a data in flight value, a feedback period, and the like, may be determined and/or obtained for each candidate path. For example, the data rate may be determined based on the data stream being captured by the imaging devices, cameras, sensors, etc. of a vehicle that is being remotely operated, a congestion value (e.g., congestion window, etc.) may be determined based on timing associated with previously sent packets, a data in flight value may be determined based on feedback received regarding the receipt of previously sent packets, and the feedback period may be determined on the timing associated with when feedback is received based on previously sent packets.

After the network information has been determined and/or obtained, in exemplary implementations of the present disclosure that employs a token bucket technique (e.g., a token bucket for each candidate path), a refill rate may be determined for the token buckets associated with each path, as well as for a global token bucket, as in step 704. The refill rate for each path may represent for example, a redundancy capacity for each path and/or a margin, in terms of tokens, that is available before the path becomes congested. For example, the refill rate for each path may represent a redundancy capacity for each path and the global token bucket refill rate may be a sum of the refill rates for all paths. According to exemplary embodiments of the present disclosure, the refill rate for each available path may be represented as:

$$\text{refill rate} = \frac{\text{Congestion}-\text{Data}_{Flight}}{\text{Data Rate}*\text{Feedback Period}}$$

where Congestion may represent a congestion value, such as a congestion window, DataFlight may represent data in flight (e.g., expressed as bits, bytes, etc.), Data Rate may represent the data rate of the incoming data stream (e.g., expressed as a bitrate, a byte-rate, etc.), and Feedback Period may represent a time between feedback that is received.

In step 706, the current redundancy of data packets being achieved may be compared to a target and/or desired redundancy. According to exemplary embodiments of the present disclosure, the current redundancy may be represented by the global token bucket refill rate and the target and/or desired redundancy may be the amount of redundancy desired in connection with the data packets via the one or more selected paths, a redundancy limit, as described in connection with FIG. 6, and the like. In exemplary implementations of the present disclosure, the comparison of the current redundancy to the target redundancy may be represented as a ratio, percentage, and the like.

In step 708, the comparison of the current redundancy to the target/desired redundancy (e.g., in the form of a ratio, percentage, etc.) may be compared against a limit or threshold value. In the event that the comparison of the current redundancy to the target/desired redundancy is not less than the limit/threshold value, the incoming bitrate is not modified, and exemplary method 700 proceeds to step 716, where the path token bucket values for each path and the global token bucket may be refilled according to their respective refill rates. For example, the corresponding refill rates may be added to the value of the path token buckets corresponding to each candidate path and the global token bucket value.

After the token bucket values have been refilled, in step 718, one or more of the candidate paths are selected to determine the transmission paths based on the path token bucket values and the global redundancy value. For example, the N number of paths having the greatest path token bucket values may be selected, where N refers to a floor integer value of the global redundancy value. Accordingly, in an exemplary implementation where the global redundancy value is 3.7, the three transmission paths having the highest token bucket values may be selected. After selection of one or more paths, data packets may be transmitted on the selected paths.

In step 720, after transmission of the packets, the path token bucket values for the selected paths and the global token bucket value may be updated. For example, the path token bucket values for each selected path may be subtracted by one (e.g., to represent the transmitted packet) and the global token bucket value may be subtracted by the total number of transmitted packets across all selected paths. Continuing the above example where three transmission paths were selected and three packets were transmitted, the token bucket values for each selected path on which a packet was transmitted may be subtracted by one and the global token bucket value may be subtracted by three.

In step 722, it may then be determined if the current feedback period has completed with the receipt of the next feedback information. In the event that the next feedback has not been received, exemplary adaptive path selection process 700 returns to step 716. Alternatively, adaptive selection process 700 returns to step 702, so as to determine and/or obtain updated current network information, which may be used to determine updated refill rates and an updated global redundancy value.

In exemplary embodiments where the current redundancy to the target/desired redundancy is less than the limit/threshold value, the incoming data rate may be modified, as shown in FIG. 7. As illustrated, it may then be determined whether the data rate is within a defined range modified, as in step 710. For example, the defined range may include a lower threshold and an upper threshold to ensure that the incoming data rate does not dip below the lower threshold and does not exceed the upper threshold. In the event that the data rate is not within the defined range (e.g., below the lower threshold or above the upper threshold), exemplary process 700 proceeds to step 716, without having modified the data rate.

In the event that the data rate is within the defined range, an adjusted data rate may be determined, as in step 712. According to exemplary implementations, in determining the adjusted data rate, a data rate adaptation factor may first be determined. According to certain embodiments of the present disclosure, the data rate adaptation factor may be represented as:

$$\text{data rate adaptation factor} = \frac{\text{Current Redundancy}}{\text{Target Redundancy}} * (1 + \alpha)$$

where Current Redundancy may be actual redundancy based on the number of data packets being sent and may be the global token bucket refill rate, the Target Redundancy may be a target and/or desired redundancy and may be a redundancy limit, as described in connection with FIG. 6, and a may be a positive constant. According to certain aspects of the present disclosure, the Current Redundancy may be a filtered, smoothed value of the global redundancy refill rate. Additionally, in certain implementations, the data rate adaptation factor may be clamped to upper and lower thresholds, so as to avoid large swings in the data rate. Accordingly, the data rate adaptation factor may be applied to the previous data rate, so as to obtain and/or determine the adjusted data rate. After the adjusted rate has been determined, a command may be sent (e.g., to a codec, etc.) to adjust the data rate of the incoming data stream, as in step 714, and process 700 returns to step 716.

Figure 8:
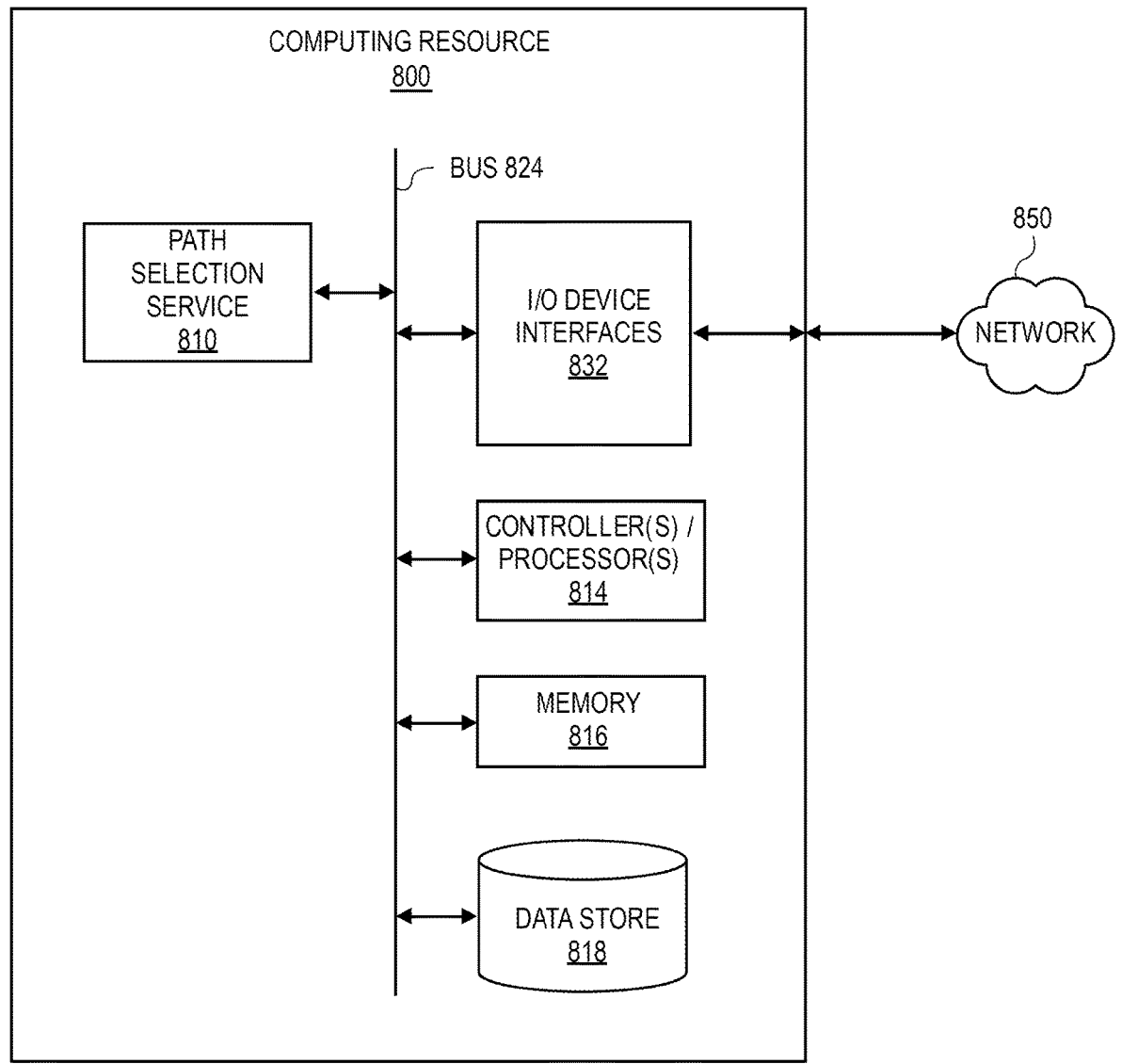
FIG. 8 is a block diagram of an exemplary computing resource, according to exemplary embodiments of the present disclosure.

FIG. 8 is a block diagram of an exemplary computing resource 800, according to exemplary embodiments of the present disclosure. According to certain implementations, computing resource 800 may form, for example, computing resources 120 and/or computing resources arranged on vehicle 110, and may include and/or execute path selection service 810. In exemplary implementations, multiple computing resources 800 may be included in the system.

As shown in FIG. 8, computing resource 800 may include one or more controllers and/or processors 814, that may each include a central processing unit (CPU) for processing data and computer-readable instructions, and memory 816 for storing data and instructions. Memory 816 may individually include volatile random-access memory (RAM), non-volatile read only memory (ROM), non-volatile magnetoresistive random-access memory (MRAM) and/or other types of memory. Each computing resource 800 may also include a data storage component 818, for storing data, controller/processor-executable instructions, machine learning models, data sets, reference data sets, test data sets, program information, call graphs, source code, compiled code, run-time and/or dynamic information, and the like. Each data storage component may individually include one or more non-volatile storage types such as magnetic storage, optical storage, solid-state storage, etc. Each computing resource 800 may also be connected to removable or external non-volatile memory and/or storage (such as a removable memory card, memory key drive, networked storage, etc.), internal, and/or external networks 850 (e.g., the Internet, cellular networks, satellite networks) through respective input/output device interfaces 832.

Computer instructions for operating computing resource 800 and its various components may be executed by the respective server's controller(s)/processor(s) 814, using the memory 816 as temporary "working" storage at runtime. The computer instructions may be stored in a non-transitory manner in non-volatile memory 816, storage 818, and/or an external device(s). Alternatively, some or all of the executable instructions may be embedded in hardware or firmware on the respective device in addition to or instead of software.

For example, memory 816 may store program instructions that, when executed by the controller(s)/processor(s) 814, cause the controller(s)/processors 814 to select paths of a network link for transmitting data packets, as discussed herein.

Computing resource 800 may also include input/output device interfaces 832. A variety of components may be connected through the input/output device interfaces. Additionally, computing resource 800 may also include an address/data bus 824 for conveying data among components of the respective server. Each component within computing resource 800 may also be directly connected to other components in addition to (or instead of) being connected to other components across the bus 824.

The components of the computing resource 800, as illustrated in FIG. 8, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 3, 6, and 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Moreover, the systems and methods described herein may be implemented in electronic hardware, computer software, firmware, or any combination thereof. For example, in some implementations, processes or methods described herein may be operated, performed or executed using computer-readable media having sets of code or instructions stored thereon. Such media may include, but need not be limited to, random-access memory ("RAM") such as synchronous dynamic random-access memory ("SDRAM"), read-only memory ("ROM"), non-volatile random-access memory ("NVRAM"), electrically erasable programmable read-only memory ("EEPROM"), FLASH memory, magnetic or optical data storage media, or others. Alternatively, or additionally, the disclosed implementations may be realized at least in part by a computer-readable communication medium that carries or communicates program code in the form of instructions or data structures and that may be accessed, read, and/or executed by a computer. Additionally, code or instructions may be executed by one or more processors or other circuitry. For example, in some implementations, such components may include electronic circuits or hardware, programmable electronic circuits such as microprocessors, graphics processing units ("GPU"), digital signal processors ("DSP"), central processing units ("CPU") or other suitable electronic circuits, which may be executed or implemented using computer software, firmware, or any combination thereof, to perform the various operations described herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computing system, comprising:

one or more processors; and a memory storing program instructions that, when executed by the one or more processors, cause the one or more processors to at least:

initialize a plurality of path token buckets for a plurality of transmission paths of a network link;

initialize a global token bucket for a global redundancy value for the plurality of transmission paths;

determine a plurality of network information for the plurality of transmission paths, wherein the plurality of network information includes at least one of a plurality of congestion indicators for the plurality of transmission paths, a plurality of data in flight values for the plurality of transmission paths, or a feedback period;

determine, based at least in part on the plurality of network information:

a plurality of path token bucket refill rates for the plurality of path token buckets for the plurality of transmission paths; and a global redundancy refill rate for the global token bucket;

refill the plurality of path token buckets using the plurality of path token bucket refill rates to obtain a plurality of refilled path token buckets;

refill the global token bucket using the global redundancy refill rate to obtain a refilled global token bucket;

determine, based at least in part on the plurality of refilled path token buckets and the refilled global token bucket, at least one first transmission path of the plurality of transmission paths as a selected at least one transmission path; and transmit a data packet on the selected at least one transmission path.

2. The computing system of claim 1, wherein the plurality of network information further includes an incoming data rate.

3. The computing system of claim 2, wherein a first path token bucket refill rate of the plurality of path token bucket refill rates is a function of a first difference between a respective congestion indicator of the plurality of congestion indicators and a respective data in flight value of the plurality of data in flight values divided by a product of the incoming data rate and the feedback period.

4. The computing system of claim 1, wherein the global redundancy refill rate is a sum of the plurality of path token bucket refill rates.

5. The computing system of claim 1, wherein the program instructions, when executed by the one or more processors, further cause the one or more processors to at least:

update path token buckets of the plurality of path token buckets associated with the selected at least one transmission path based at least in part on the transmission of the data packet on the selected at least one transmission path;

update the global token bucket based at least in part on the transmission of the data packet on the selected at least one transmission path;

refill the plurality of path token buckets using the plurality of path token bucket refill rates to obtain a second plurality of refilled path token buckets;

refill the global token bucket using the global redundancy refill rate to obtain a second refilled global token bucket;

determine, based at least in part on the second plurality of refilled path token buckets and the second refilled global token bucket, at least one second transmission path of the plurality of transmission paths as a second at least one selected transmission path, and transmit a second data packet on the second at least one selected transmission path.

6. A computer-implemented method, comprising:

determining, based at least in part on a plurality of network information, a plurality of path token bucket values for a plurality of path token buckets associated with a plurality of transmission paths, wherein the plurality of network information includes at least one of a congestion indicator, a data in flight value, a feedback period, or an incoming data rate of an incoming data stream;

determining, based at least in part on the plurality of network information, a global token bucket value for a global token bucket;

determining, based at least in part on the plurality of path token bucket values and the global token bucket value, at least one transmission path from the plurality of transmission paths for transmitting a data packet of the incoming data stream;

determining a second plurality of network information, wherein the second plurality of network information includes at least one of a second congestion indicator or a second data in flight value;

determining, based at least in part on the second plurality of network information, the feedback period, and the incoming data rate, a second plurality of path token values associated with the plurality of transmission paths;

determining, based at least in part on the second plurality of network information, the feedback period, and the incoming data rate, a second global token bucket value; and determining, based at least in part on the second plurality of path token bucket values and the second global token bucket value, at least one second transmission path from the plurality of transmission paths for transmitting a second data packet.

7. The computer-implemented method of claim 6, wherein determining the plurality of path token bucket values for the plurality of path token buckets includes at least:

determining, based at least in part on the plurality of network information, a plurality of path token bucket refill rates for the plurality of path token buckets; and refilling a plurality of previous values associated with the plurality of path token buckets using the plurality of path token bucket refill rates to determine the plurality of path token bucket values for the plurality of path token buckets.

8. The computer-implemented method of claim 7, wherein determining the global token bucket value for the global token bucket includes at least:

determining, based at least in part on the plurality of path token bucket refill rates, a global token bucket refill rate for the global token bucket; and refilling a previous value for the global token bucket using the global token bucket refill rate to determine the value for the global token bucket.

9. The computer-implemented method of claim 8, wherein determining the global token bucket value for the global token bucket further includes at least:

prior to refilling the previous value for the global token bucket:

determining that the global token bucket refill rate exceeds a threshold value; and capping the global token bucket refill rate to the threshold value.

10. The computer-implemented method of claim 8, further comprising:

updating path token bucket values of the plurality of path token bucket values of the plurality of path token buckets associated with the at least one transmission path based at least in part on a transmission of data packets on the at least one transmission path;

updating the global token bucket based at least in part on the transmission of the data packets on the at least one transmission path;

refilling the plurality of path token buckets using the plurality of path token bucket refill rates to obtain a second plurality of refilled path token buckets;

refilling the global token bucket using the global token bucket refill rate to obtain a second refilled global token bucket;

determining, based at least in part on the second plurality of refilled path token buckets and the second refilled global token bucket, at least a second portion of the plurality of transmission paths as a second plurality of selected transmission paths, and transmitting a second data packet on each of the second plurality of selected transmission paths.

11. The computer-implemented method of claim 8, wherein the incoming data rate is held constant.

12. The computer-implemented method of claim 6, wherein determining the at least one transmission path from the plurality of transmission paths includes:

determining a number of transmission paths to be selected by obtaining a floor integer value of the global token bucket value; and determining the number of transmission paths from the plurality of transmission paths having a highest relative path token bucket value among the plurality of path token bucket values.

13. The computer-implemented method of claim 6, further comprising:

prior to determining the global token bucket value for the global token bucket or determining the plurality of path token bucket values for the plurality of path token buckets:

comparing a current redundancy to a target redundancy;

determining that the comparison of the current redundancy to the target redundancy is below a threshold value; and in response to the determination that the comparison of the current redundancy to the target redundancy is below the threshold value:

determining an adjusted incoming data rate;

modifying the incoming data rate of the incoming data stream to the adjusted incoming data rate; and replacing the incoming data rate with the adjusted incoming data rate in the plurality of network information.

14. The computer-implemented method of claim 13, further comprising:

prior to determining the adjusted incoming data rate:

determining that the incoming data rate is within a predetermined range.

15. A vehicle, comprising:

a plurality of sensors;

one or more processors; and a memory storing program instructions that, when executed by the one or more processors, cause the one or more processors to at least:

obtain a data stream at an incoming data rate that corresponds to information captured by the plurality of sensors;

obtain a first plurality of network information for a first transmission path;

obtain a second plurality of network information for a second transmission path;

initialize a first path token bucket for the first transmission path;

initialize a second path token bucket for the second transmission path;

initialize a global token bucket;

determine, based at least in part on the incoming data rate and the first plurality of network information, a first path refill rate;

determine, based at least in part on the incoming data rate and the second plurality of network information, a second path refill rate;

determine, based at least in part on the first path refill rate and the second path refill rate, a global refill rate;

refill the first path token bucket using the first path refill rate to obtain a first refilled path token bucket;

refill the second path token bucket using the second path refill rate to obtain a second refilled path token bucket;

refill the global token bucket using the global refill rate to obtain a refilled global token bucket;

determine, based at least in part on the first refilled path token bucket, the second refilled path token bucket, and the refilled global token bucket, at least one of the first transmission path or the second transmission path as a selected transmission path; and transmit a data packet of the data stream via the selected transmission path.

16. The vehicle of claim 15, wherein:

the first plurality of network information includes at least one of:

a first congestion value associated with the first transmission path;

a first data in flight value associated with the first transmission path;

a feedback period; or the incoming data rate; and the second plurality of network information includes at least one of:

a second congestion value associated with the second transmission path;

a second data in flight value associated with the second transmission path;

the feedback period; or the incoming data rate.

17. The vehicle of claim 15, wherein:

the first path refill rate represents a first margin associated with the first transmission path;

the second path refill rate represents a second margin associated with the second transmission path; and the global refill rate represents a global redundancy value across the first transmission path and the second transmission path.

18. The vehicle of claim 15, wherein the program instructions, when executed by the one or more processors, further cause the one or more processors to at least:

obtain a third plurality of network information associated with the first transmission path;

obtain a fourth plurality of network information associated with the second transmission path;

determine, based at least in part on the incoming data rate and the third plurality of network information, a third path refill rate;

determine, based at least in part on the incoming data rate and the fourth plurality of network information, a fourth path refill rate;

determine, based at least in part on the third refill rate and the fourth refill rate, a second global refill rate;

refill the first path token bucket using the third refill rate to obtain a third refilled path token bucket;

refill the second path token bucket using the fourth refill rate to obtain a fourth refilled path token bucket;

refill the global token bucket using the second global refill rate to obtain a second refilled global token bucket;

determine, based at least in part on the third refilled path token bucket, the fourth refilled path token bucket, and the second refilled global token bucket, at least one of the first transmission path or the second transmission path as a second selected transmission path; and transmit a second data packet of the data stream via the second selected transmission path.

19. The vehicle of claim 18, wherein the incoming data rate is maintained at a constant value.

* * * * *